United States Patent [19]
Flake et al.

[11] Patent Number: 5,832,451
[45] Date of Patent: *Nov. 3, 1998

[54] AUTOMATED TRAVEL SERVICE MANAGEMENT INFORMATION SYSTEM

[75] Inventors: Wayne L. Flake, Plano; Krishna Kambhampaty, Lewisville; Stephen B. Molsberry, Plano, all of Tex.; Gregory B. Clem, Scottsdale, Ariz.

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 589,934

[22] Filed: Jan. 23, 1996

[51] Int. Cl.$^6$ ...................................................... G07G 1/12
[52] U.S. Cl. .................................. 705/5; 705/6; 707/101; 707/104
[58] Field of Search ...................................... 395/201, 206, 395/207; 705/1, 5, 6, 7; 707/2, 3, 4, 10, 101, 104, 201

[56] References Cited

U.S. PATENT DOCUMENTS

| | | | |
|---|---|---|---|
| 4,862,357 | 8/1989 | Ahlstrom et al. | 364/407 |
| 5,021,953 | 6/1991 | Webber et al. | 364/407 |
| 5,237,499 | 8/1993 | Garback | 364/407 |
| 5,331,546 | 7/1994 | Webber et al. | 364/407 |
| 5,576,951 | 11/1996 | Lockwood | 395/227 |

FOREIGN PATENT DOCUMENTS

| | | | |
|---|---|---|---|
| 0 644 499 A2 | 3/1995 | European Pat. Off. | G06F 17/60 |
| 0 690 398 A1 | 1/1996 | European Pat. Off. | G06F 17/60 |

OTHER PUBLICATIONS

*Dictionary of Computers, Information Processing & Telecommunications*, 2nd ed.; Jerry M. Rosenberg; copyright 1984, 1987; pp. 65, 527, and 680.

Perez; "Software to Organize Downloaded Data"; *Link–Up*; v5 n4, p7(2); Jul.–Aug., 1988; Dialog: File 148, Acc# 03724126.

Henderson; "Computer Reservation Systems Plunge into the PC Era"; *Air Transport World*; v25 n8; p47(6); Aug. 1988; Dialog; File 148, Acc# 03674465.

Godwin; "CRS Product Development is More Evolution than Revolution"; *Travel Weekly*; v48 n86; p36(2); Oct. 26, 1989; Dialog: File 148, Acct# 04127396.

"Travel Vendors"; *Business Travel News*; Nov. 12, 1990; p. 19; Dialog: File 16, Acct# 02862770.

Ricciuti; "Universal Database Access"; *Datamation*; v37 n22; p30(4); Nov. 1, 1991; Dialog: File 47, Acc# 03627691.

*Dialog Pocket Guide 1992/1993*; pp. 22 and 35–40.

Goodwin; "Travel Agency in a Box' Automation Package Set; Front– and Middle–Office Management System"; *Travel Weekly*; v52 n84; p62(1); Oct. 25, 1993; Dialog: File 148, Acc# 06742419.

Primary Examiner—Stephen R. Tracs
Attorney, Agent, or Firm—T. Murray Smith; L. Joy Griebenow

[57] ABSTRACT

A method (1000) of automatically managing travel service information is provided. The method generates a business entity profile and individual profile for customers (1004, 1006), and stores the information in a relational database. Customer reservation services information retrieved from all available sources is also stored in the same database (1010). Consequently, the customer reservation services information and the profile information is made available, simultaneously, for use by an agent in processing a customer's travel request (1013).

22 Claims, 16 Drawing Sheets

5,832,451

AUTOMATED TRAVEL SERVICE MANAGEMENT INFORMATION SYSTEM

TECHNICAL FIELD OF THE INVENTION

This invention relates generally to the field of customer reservation services, and more particularly, to an automated travel service management information system and method of operation.

BACKGROUND OF THE INVENTION

Travel agencies train and employ agents to coordinate customers' travel plans with travel-related services supplied by airlines, hotels, auto rental agencies, etc. Typically, in order to determine the availability of these services and make reservations, travel agents may access (via a remote workstation) one of a number of proprietary travel reservation systems. For example, in order to determine the availability of seating on a specific airline flight, an agent may access the SABRE System, which is a computer reservation system (CRS) developed and marketed by American Airlines. Other computer reservation systems are also available, such as Worldspan® owned by Pars Marketing Partnership, Apollo® owned by Galileo International Partnership, and System One® owned by Amadeus Global Travel Distribution.

Although a number of proprietary computer reservation systems are available, from a travel agency's viewpoint, these systems are inefficient and not cost effective to use. For example, work-related travel arrangements may be (and usually are) subject to certain restrictions imposed by a customer's employer. Employers often limit airline travel expenditures to tourist class or business class rates. Also, employers often negotiate discounted rates for their employees, such as hotel or automobile rental rates, and then limit travel expenditures to those discounted rates. Although existing proprietary computer reservation systems may maintain such employer-imposed restriction information, in order to obtain that type of information from a particular system, an agent needs to know that system's unique information codes. However, most agents are typically trained to access and use only one or two proprietary computer reservation systems, because cross-training agents to use all of the unique systems would be extremely costly for the agency.

Furthermore, although a number of proprietary computer reservation systems are available for use by agencies, these systems are not integrated to provide all of the available services at one time. Consequently, if an agent desires to make a complete set of travel arrangements for a customer, the agent has to access a system multiple times. For example, in order to arrange for a customer's airline travel, automobile rental, and hotel accommodations, a travel agent typically accesses the proprietary system to reserve airline seating and obtain prices and tickets, then again using different commands to obtain prices and reserve a rental car, and a third time to obtain prices and reserve a hotel room. Since an agent's productivity decreases with increases in request processing time, the present sequential method of processing travel requests is highly inefficient. Such inefficiencies result in increased operational costs and reduced profitability for the agency. Additionally, the agent cross-training required for three proprietary systems, significantly increases the agency's costs.

Presently, in order to minimize operational costs, travel agencies typically assign specific agents to process travel requests made by specific customers and business organizations, and for specific travel-related functions. However, these specialized uses of agents are neither very efficient nor cost-effective. For example, one agent's corporate customer may request travel arrangements for several employees, while at the same time, one or more of the other agents in the office may be idle.

SUMMARY OF THE INVENTION

Accordingly, a need has arisen for an automated travel management information system which incorporates all available customer reservation service information into one database, including customer preference information.

In accordance with a preferred embodiment of the present invention, a method of operating an automated travel service management information system is provided which maintains a business entity profile and/or an individual profile for each agency customer, in a relational database. The system also maintains information retrieved from a plurality of computer reservation systems, in the relational database. In response to a customer's travel request, the system automatically retrieves, and displays for decision-making by an agent, all pertinent information retrieved from the customer's business entity profile and/or individual profile, and the appropriate computer reservation system(s).

An important technical advantage of the present invention is that travel service information from a plurality of computer reservation systems is stored and readily available in a single database format. Consequently, travel agents do not require cross-training to use a plurality of computer reservation systems, and their productivity can be increased.

Another important technical advantage of the present invention is that customer preference information is also stored and readily available in a database. Consequently, an agent can take the customer preferences (e.g., restrictions) into account while making travel arrangements.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–22 of the drawings, like numerals being used for like and corresponding parts of the various drawings.

Figure 1:
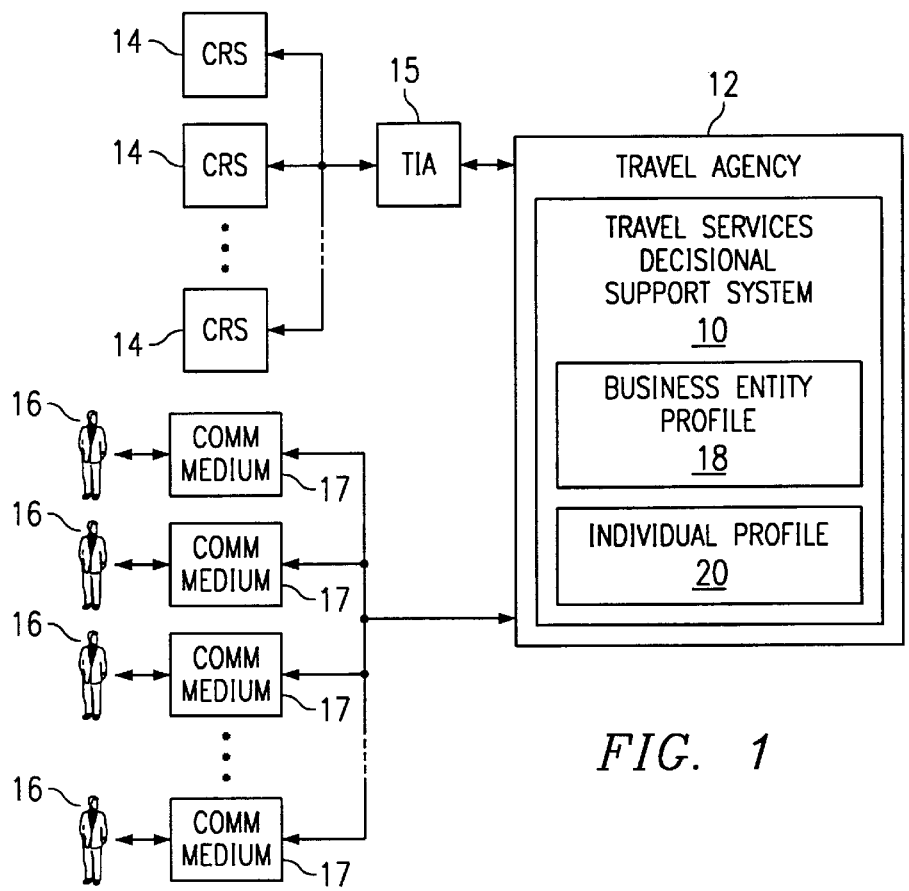
FIG. 1 is a top level block diagram which illustrates an environment in which an automated travel management information system can operate, in accordance with a preferred embodiment of the present invention.

FIG. 1 is a top level block diagram that illustrates an environment in which an automated travel management information system can function and operate, in accordance with a preferred embodiment of the present invention. Referring to FIG. 1, an automated travel management information system (hereinafter, referred to as the "system") 10 is shown. System 10 is preferably used to provide customer travel services, by one or more travel agents employed by agency 12.

A plurality of computer reservation systems 14 can be linked electronically with agency 12 via a communications processor 15. In the preferred embodiment, the communications processor 15 is preferably a communications processor and file server data storage interface referred to herein as a travel information analysis (TIA) subsystem. As described above, each computer reservation system 14 may be one or more commercially available computer reservation systems, such as, for example, the SABRE, Worldspan®, Apollo®, or System One® systems. Computer reservation systems 14 provide travel service inventory information, such as airline flight, rail, hotel, limousine, and rental automobile availability and rates. TIA subsystem 15 functions as a communications interface and temporary data storage medium, between each of computer reservation systems 14 and system 10. Preferably, the inventory information provided by computer reservation systems 14 is ultimately received for processing by system 10.

Generally, system 10 preferably functions to centralize the travel service information received from each of computer reservation systems 14. Consequently, although each computer reservation system formats its travel service information and command structures differently, system 10 functions to integrate the different information and commands into one format for use by all travel agents.

One or more travel agency customers 16 can communicate with one or more travel agents via any one of a number of communications subsystems 17. Each communications subsystem 17 preferably functions to provide two-way communications between a customer and an agent. For example, one such communications subsystem may be a telephone system, a second such subsystem may be a facsimile machine, and a third such subsystem may be a computer-driven system providing E-mail communications. Travel service request information from a customer is preferably input as data to system 10, by an agent.

In the preferred embodiment, system 10 includes a relational database, which resides in a data storage medium (to be described in detail below). A business entity profile data structures 18 and/or an individual entity profile data structures 20 is included in the relational database in system 10, for each individual and business travel customer of the agency. Each such profile preferably contains, at a minimum, that customer's respective personal and travel preference information. For example, a customer's business entity profile 18 can contain that business' name and address, the travel coordinator's name, travel expenditure restrictions, vendor preferences, and negotiated discount rate information. An individual entity profile 20 preferably contains, at a minimum, an individual customer's personal information and travel preferences, such as, for example, the customer's name and address, employer, seating preference, smoking or non-smoking preference, a list of preferred vendors (e.g., airlines), etc.

System 10 maintains the business and individual entity profile information, along with all available customer reservation information, in the relational database. System 10 processes this information and, where necessary, converts the information to a standardized format. Consequently, via system 10, a customer's profile and the customer reservation information are made available to an agent, all at the same time the travel arrangements are being made. Consequently, the agent's productivity is increased, because the agent is not required to access more than one computer reservation system. Additionally, when making the travel arrangements, the agent can take the customer's preferences into account, which is beneficial for the customer, the agency, and their relationship.

Figure 2:
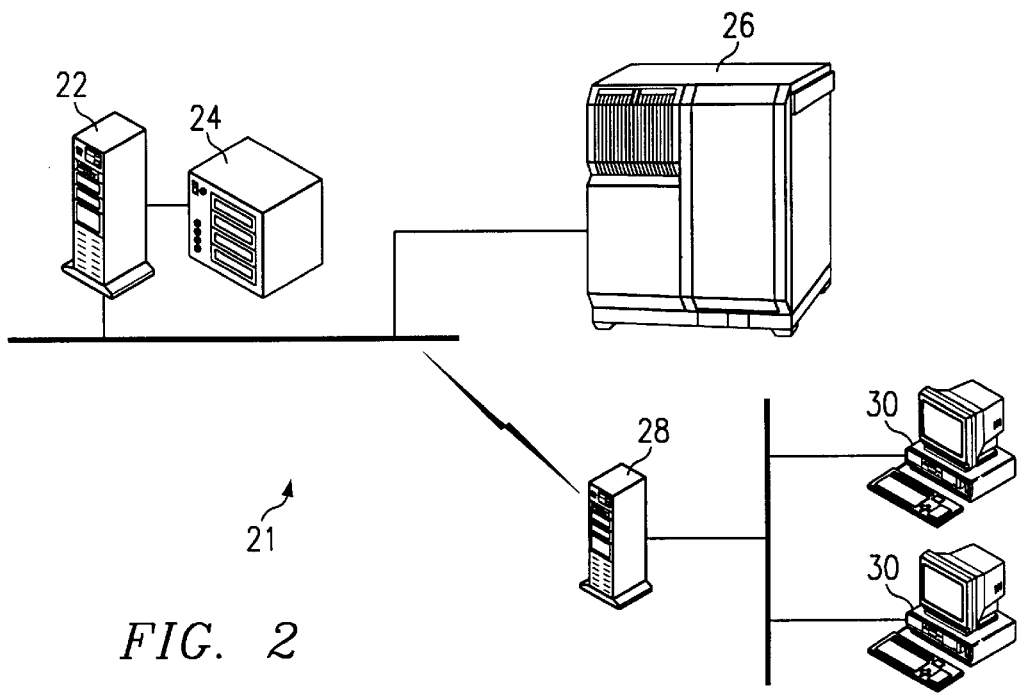
FIG. 2 is a simplified diagram of a computer-based system that can be used to implement the automated travel management information system shown in FIG. 1.

FIG. 2 is a simplified diagram of an exemplary computer-based system 21 that can be used to implement the automated travel management information system shown in FIG. 1. Referring to the embodiment shown in FIG. 2, the computer-based system 21 can include a process server 22, a data storage device 24, a mainframe computer 26, a local file server 28, and a plurality of workstations or desktop computers 30.

Process server 22 preferably functions to process travel-related data and command information. A Sun Solaris 2.3 system has been successfully utilized as process server 22. Data storage device 24 can be a mass storage subsystem of tapes and/or disk drives, which is electrically coupled to process server 22. In the preferred embodiment, a relational database resides in data storage device 24. Consequently, process server 22 may retrieve, process and store the information in the relational database residing in data storage device 24.

The mainframe computer 26 may be linked electronically to process server 24 through a local or wide area network (LAN/WAN), for automated uploading and downloading of information therebetween. Any general purpose or medium sized computer, which includes a central processing unit (CPU) and suitable RAM, ROM and I/O circuitry, can be utilized for mainframe 26.

Local file server 28 may be linked electronically to process server 22 by the same or a different local or wide area network, or by telecommunication lines through a modem (not explicitly shown). Additionally, as shown (for illustrative purposes only) in FIG. 2, process server 22 can be linked by a "gateway" interface communications processor to local file server 28. Local file server 28 is preferably connected to a plurality of workstations or desktop computers 30. A user of system 10, such as a travel agent or a system user, may input and receive travel- and customer-related information, and system information, respectively, through any of the workstations 30. Preferably, each workstation 30 is a desktop computer having at least a 486 processor or an operational equivalent. Systems programming for the automated travel services management information system may be performed using a high level programming language, such as $C^{++}$.

The business entity profile information (18) and individual profile information (20), for each of the agency's customers, is preferably stored in the relational database residing in data storage device 24. Process server 22, mainframe computer 26, local file server 28, and workstations 30 are preferably linked together. Consequently, each of these devices can directly access (e.g., store and retrieve) the business and individual profile information, if necessary.

Computer-based system 21 is electronically linked to the computer reservation systems 14 preferably via TIA subsystem 15 (FIG. 1). Consequently, system 10 can receive, store (e.g., in the relational database), process, and display (e.g., via workstation 30) all available customer reservation service information. In another aspect of the invention, computer-based system 21 can also be linked electronically to each of customers 16 via a respective digital communications link (17) so that each customer's travel request can be processed automatically by system 10, as opposed to having the customer interact with system 10 through an agent.

Figure 3:
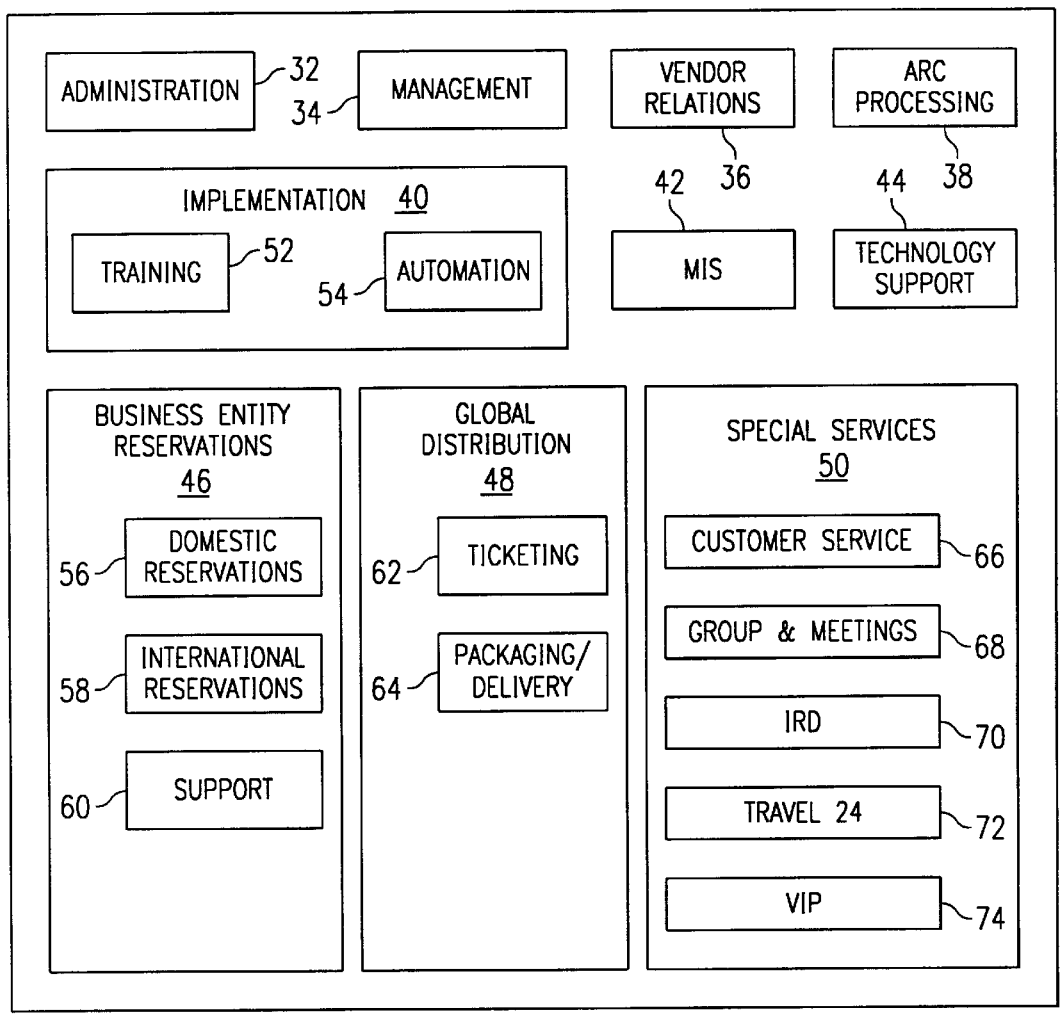
FIG. 3 is a simplified top level block diagram which illustrates a plurality of manual and automated functions that can be performed at the travel agency shown in FIG. 1, in accordance with the preferred embodiment of the present invention.

FIG. 3 is a simplified top level block diagram which illustrates a plurality of manual and automated functions that can be performed at the travel agency shown in FIG. 1, in accordance with the preferred embodiment of the present invention. Referring to FIG. 3, the functions described with respect to FIG. 1 can be separated into a plurality of manual, software, and hardware components: an administration component 32, a management component 34, a vendor relations component 36, an airline reporting company (ARC) processing component 38, an implementation component 40, a management information system (MIS) component 42, a technology support component 44, a business entity reservations component 46, a global distribution component 48, and a special services component 50.

In the preferred embodiment of the present invention, system 10 functions primarily to process software functions associated with the business entity reservations component 46, global distribution component 48, and special services component 50. The administration component 32, management component 34, vendor relations component 36, ARC processing component 38, implementation component 40, MIS component 42, and technology support component 44 are primarily manual or software-assisted functions, or functions performed by mechanical or electronic systems other than by system 10. These other systems are described herein to illustrate an agency's operational environment and provide a clear understanding of the present invention.

Specifically, the administration component 32 includes such functions as secretarial support, local area network (LAN) administration, telephone support, managing the facilities of travel agency 12, and purchasing appropriate supplies for the agency.

The management component 34 includes such functions as managing the agency's finances, providing a budget, and managing the agency's human resources.

The vendor relations component 36 includes such functions as developing relationships with various travel services vendors, such as airlines and hotels. Vendor relations component 36 also includes the function of managing vendor agreements, such as negotiating agreements and ensuring that the agreements are enforced.

The ARC processing component 38 includes the function of interfacing between the agency and airline reporting companies. These ARCs oversee such functions as airline payments of agency commissions, and collections of fees from the agencies on behalf of airlines.

The implementation component 40 includes such functions as managing and coordinating the inclusion of existing and new customers into a reservation center database, such as, for example, the Global Travel Services Center (GTSC) database. Travel agencies can contract out certain tasks to a reservation center, rather than performing the task in-house.

The MIS component 42 includes such functions as maintaining a management information system, which, for example, can generate a report on the amounts each customer has spent on travel services during a predetermined period of time.

The technology support component 44 includes such functions as working directly with customers to develop and understand new technologies.

System 10 processes the software routines of the business entity reservations component 46, global distribution component 48, and special services component 50. These components are preferably implemented as computer-driven software routines that assist an agent in making decisions on travel arrangements, in response to a customer's request.

Generally, in accordance with the embodiment shown in FIG. 3, the business entity reservations component 46 preferably includes a plurality of subcomponents or software subroutines, such as a domestic reservations component 56, an international reservations component 58, and a support component 60.

The domestic and international reservations components (56 and 58) include such functions as arranging travel reservations in response to a customer's request, changing the reservations in response to the customer's request, and canceling the reservations, if an agent is requested to do so.

The support component 60 includes such functions as performing quality assurance (QA) for travel services, updating customer information in the business entity and individual profiles, and providing the services of an in-house service representative.

The global distribution component 48 manages a subsystem, which an agency can use to distribute travel-related documents, such as airline tickets and written hotel reservations. The global distribution component 48 preferably includes a ticketing component 62 and a packaging/delivery component 64. The ticketing component 62 functions to cause a ticket to be printed for travel services, on appropriate paper stock. The packaging/delivery component 64 includes the manual functions of packaging the tickets and delivering them to customers. The global distribution component 48 also functions to oversee the disposition of tickets that have been returned by customers.

The special services component 50 preferably includes a customer service component 66, a group & meetings component 68, an international rate desk (IRD) component 70, a travel-24 component 72, and a VIP component 74. The customer service component 66 functions to question agency customers as to their satisfaction with the agencies' services. The group and meetings component 68 includes the function of arranging meeting and presentation facilities for customers on travel. The IRD component 70 functions to determine and verify rates for travel services in other countries. The travel-24 component 72 functions to provide the agency's customers with twenty-four hour travel services, such as making and canceling reservations after normal business hours.

FIGS. 4–16 are exemplary flowcharts of software-driven functions that can be performed for a travel agency, in conjunction with an agent, by the business entity reservations component 46 shown in FIG. 3. Specifically, FIGS. 4–11 illustrate exemplary methods that can be performed by the domestic reservations component 56. FIGS. 12–16 illustrate exemplary methods that can be performed by the support component 60.

Figure 4:
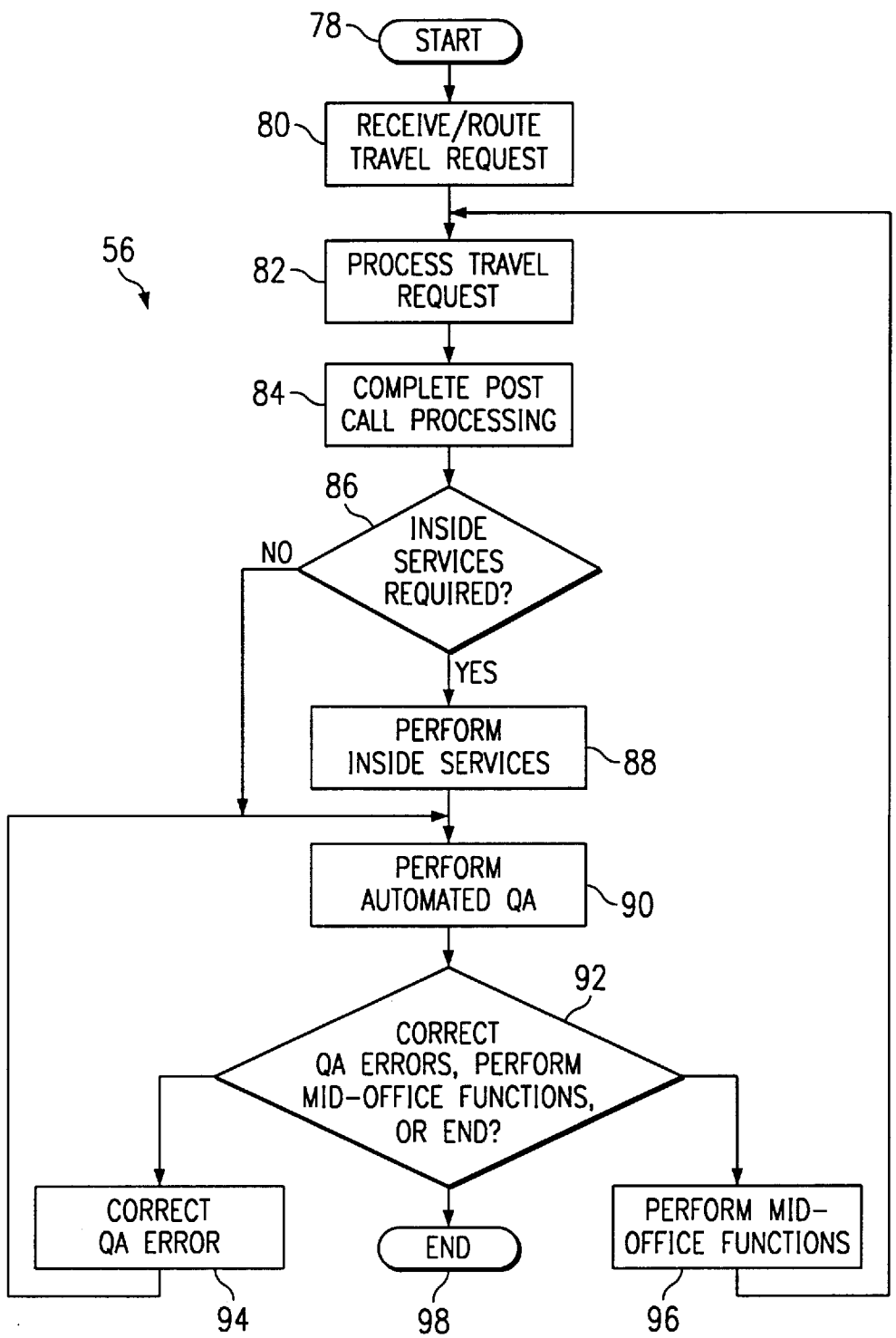
FIGS. 4–16 are exemplary flowcharts of software routines for the business entity reservations function or component shown in FIG. 3.

FIG. 4 is an exemplary flowchart for the domestic reservations software-assisted routine 56, which is shown in FIG. 3. The domestic reservations routine preferably makes travel services originating in, or located exclusively within, the national boundaries of the country in which the agency is located.

Referring to FIG. 4, system 10 initiates the domestic reservations routine 56 at block 78. At block 80, a travel request from a customer is received (via a communications subsystem 17 in FIG. 1) by an agency, and, under the control of a receive/route request software-assisted routine 80 (described in detail below with respect to FIG. 5), system 10 routes the travel request to an agent for processing. At block 82, the agent begins processing the request with the assistance of system 10. Preferably, an agent communicates with system 10 via a workstation 30. For example, an agent can input system commands and travel information by pressing appropriate keys (typing) on a workstation keyboard, or "clicking" on an option in a Windows-type display. In return, the workstation can display travel information, which is provided by system 10 for use by the agent in making travel arrangements.

Specifically, under the control of a travel request processing software-assisted routine 82 (described in detail below with respect to FIG. 6), system 10 displays for the agent (preferably via a workstation 30) the requesting customer's business and/or individual profile information, along with all customer reservation service information the agent may need to complete the desired travel arrangements. Subsequently, after completing the travel arrangements (typically with the customer's concurrence), the agent inputs appropriate commands via the workstation, and system 10 stores the travel arrangement information in the relational database in storage device 24. The agent then terminates communications with the customer.

At block 84, system 10 initiates a software-assisted routine 84 (described in detail below with respect to FIG. 10) that prompts an agent (preferably via a display on workstation 30) to perform certain follow-up tasks related to the initially completed travel arrangements. At block 86, system 10 determines whether or not the completion of the customer's initial travel arrangements should require the assistance or services of a travel services vendor (e.g., airline, etc.). For example, in order to save time, an agent may desire to complete tentative travel arrangements with the customer on the phone, and firm up the arrangements subsequently with the travel vendor(s). If such inside services are required, at block 88, system 10 initiates an inside services software-assisted routine 88 (described below with respect to FIG. 13) that prompts an agent to contact the vendor(s) and thereby consummate the travel arrangements.

Otherwise, at block 90, system 10 initiates an automated quality assurance (QA) software routine, which checks certain aspects of the travel arrangements made. A commercially available QA software routine may be used, such as the AQUA QA software routine. For example, the QA software routine can search all available computer reservation systems for lower rates than those that were booked by the agent. If the QA software identifies such an "error," the software prompts system 10 to generate a "flag" which indicates that some corrective action should be taken.

At block 92, system 10 determines whether or not an "error" identified by the QA software should be corrected. If so, at block 94, system 10 prompts an agent (via a workstation display) to make the correction (e.g., book the service at the lower rate). If, however, at block 92, no such "error" is identified, then system 10 determines whether or not any so-called "mid-office functions" should be performed. If so, at block 96, system 10 performs (or can prompt an agent to perform) certain quality assurance functions, such as, for example, periodically searching for a lower rate from vendors, up until the time a ticket for the service is printed. Otherwise, the domestic reservations software routine is terminated.

Figure 5:
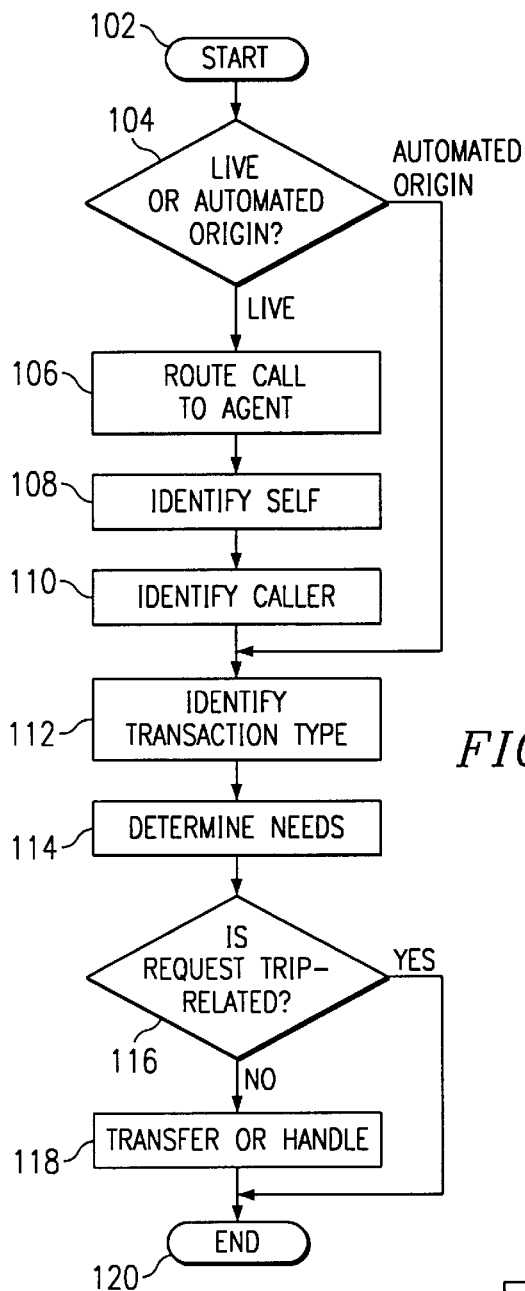

FIG. 5 is an exemplary flowchart for a receive/route travel request software-assisted routine 80, which can be used by an agency to receive and route a travel request to an agent for processing. Referring to FIG. 5, at block 104, system 10 (preferably using a conventional CTI or computer telephony integration system) determines whether or not an incoming telephone call is "live" (as opposed to a call carrying facsimile information or an e-mail message). If so, at block 106, system 10 instructs the CTI system to route the call to a travel agent. Otherwise, if the call is not "live," system 10 operates to route the call to an appropriate receiving medium (e.g., facsimile machine or e-mail postoffice in a local network). At block 112, the system prompts an agent or other agency employee to access the receiving medium (e.g., answer the call, or read the facsimile or e-mail message) and identify the type of transaction involved in the request. An example of such a transaction is a request to re-book an existing hotel reservation.

At block 114, the agent identifies precisely what the caller is requesting. At block 116, the agent determines whether or not the call includes a request for travel services. If so, the software-assisted routine is terminated, and system 10 returns to the software routine shown in FIG. 4. Otherwise, at block 118, the agent either processes the request or transfers the request to another agent for processing.

Figure 6:
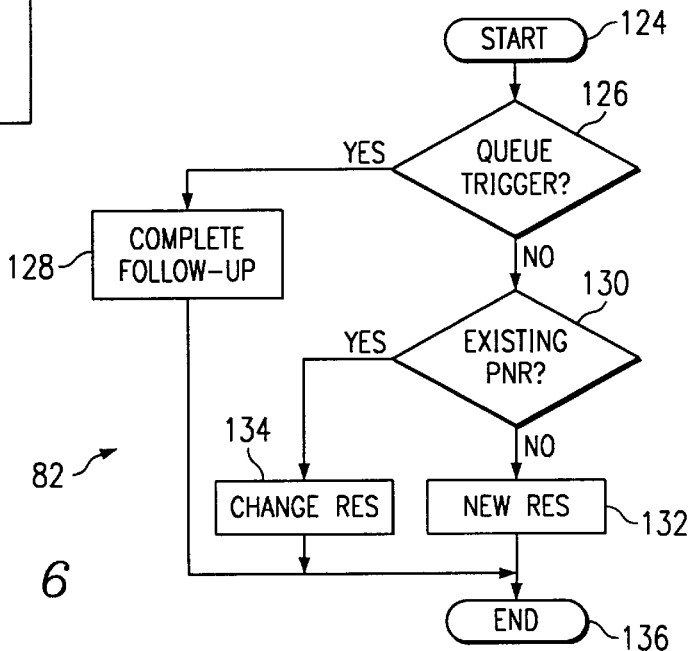

FIG. 6 is an exemplary flowchart for a software-driven subroutine 82, which functions to make or change a travel arrangement, in response to a customer's request. Essentially, under the control of the process request subroutine 82, system 10 operates to transfer travel and profile information between the relational database in storage device 24 and the agent processing the travel request.

A customer may provide travel request information directly to an agent, or system 10 can store the information temporarily in the relational database, under the control of an automatic queuing software subroutine. A "queue" can be defined as a working list of items or tasks that are awaiting action. At block 126, system 10 determines whether or not a queue (e.g., an item or task on the list) has been "triggered" or flagged by the system for action. Preferably, each agent at a particular agency can be associated with a unique set of queues that designate the types of tasks that the agency has assigned to that agent. When a queue is triggered or flagged, system 10 notifies the pertinent agent (via a workstation display) that a particular task or set of tasks is to be performed. At block 128, the notified agent responds to perform the task associated with the queue. The software subroutine is then terminated.

Otherwise, at block 130, the travel agent determines whether or not the current request can be associated with an existing passenger name record (PNR). A PNR is a record of travel arrangements made in the past for a customer, which can be identified by the customer's name. Preferably, PNRs are stored by system 10 in the relational database of storage device 24. Consequently, via a workstation 30, a travel agent can retrieve and immediately review any previous travel arrangements a customer has made.

If the current travel request cannot be associated with an existing PNR (e.g., a new customer), at block 132, the agent can enter a command (via a workstation), which instructs system 10 to initiate a new reservation software subroutine 132 (described below with respect to FIG. 8). Otherwise, at block 134, the agent can enter a command that instructs system 10 to initiate a change reservation software subroutine 134 (described below with respect to FIG. 7).

Figure 7:
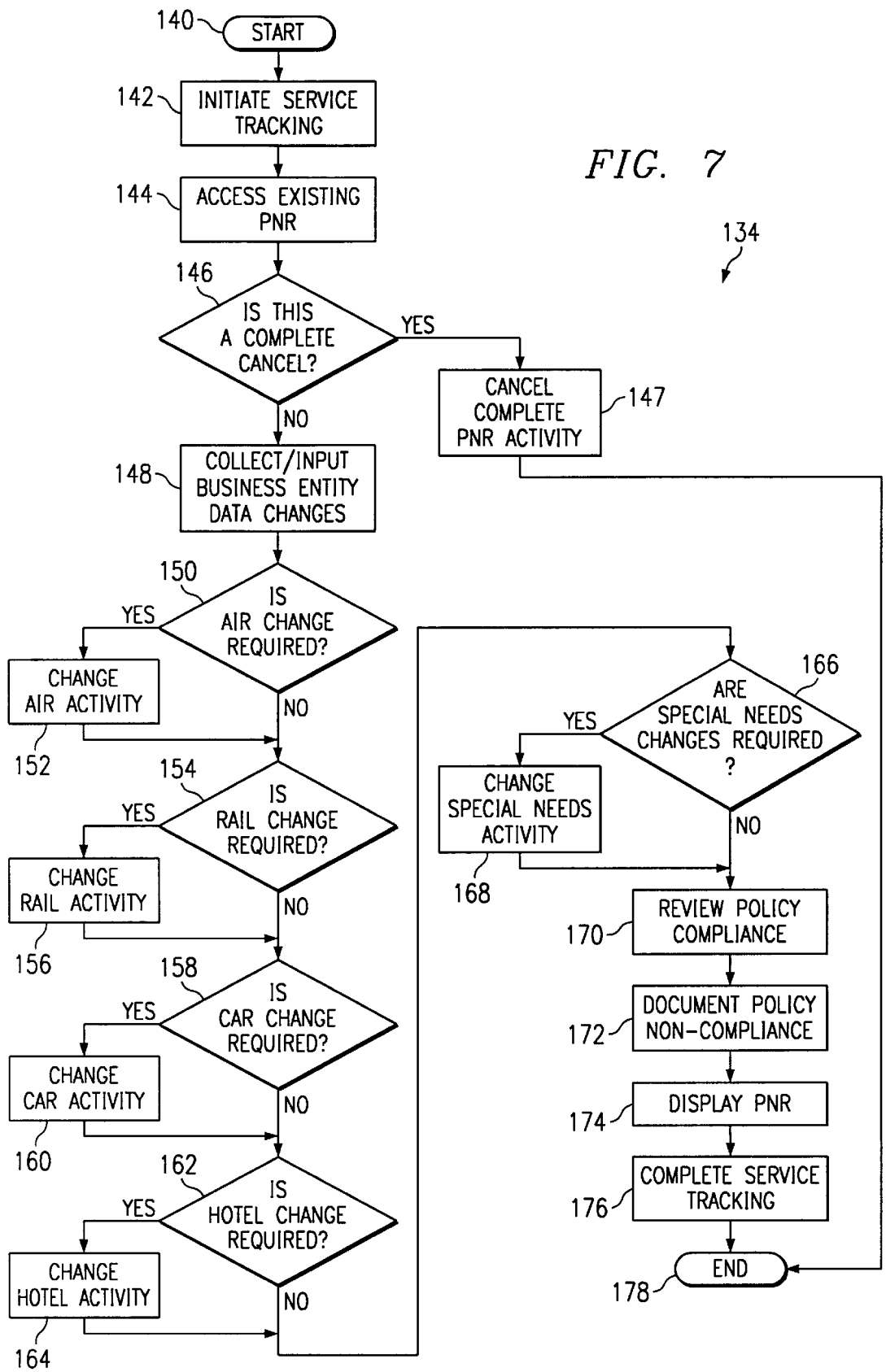

FIG. 7 is an exemplary flowchart for a software-assisted subroutine 134, which can be used by an agent to change an existing travel reservation. Preferably, under the control of the change reservation subroutine 134, system 10 prompts a travel agent to make one or more changes to an existing set of reservations.

At block 142, before any changes can be made, system 10 initiates a service tracking software subroutine. Since an agency typically can bill a customer for all services provided, the service tracking software automatically records each transaction that occurs if any arrangements are being changed. The service tracking information is preferably stored by system 10 in the relational database 24.

At block 144, system 10 searches the relational database for the requesting customer's PNR. At block 146, the system prompts the agent to determine whether or not the request includes canceling all existing travel reservations. If so, at block 147, the agent inputs a command that instructs system 10 to record the cancellation as such, in the relational database. The software subroutine 134 is then terminated.

Otherwise, at block 148, system 10 prompts the agent to obtain and input (via a workstation 30) the customer's requested business entity changes. For example, a business customer may be requesting the agent to change the company's billing code to be charged for an existing reservation.

At block 150, system 10 prompts the agent to determine whether or not a change in air travel arrangements has been requested. For example, the customer may have requested a flight change. If so, at block 152, system 10 retrieves the customer's profile information and customer reservation service information, from the relational database, and displays that information to the agent. The agent inputs the change information to system 10, which stores the information in the relational database for booking.

Essentially, the method used to determine and store air change information (blocks 150 and 152) preferably is also used to determine and store changes requested for rail, auto and hotel arrangements (blocks 154–164).

At block 166, system 10 prompts the agent to determine whether or not the customer requires any change to a "special needs" arrangement already made, such as, for example, any special facilities requested for a physically-disadvantaged customer, or a specially prepared meal. If so, at block 168, the agent inputs the requested changes to system 10, which stores the information in the relational database for booking.

At block 170, system 10 preferably displays, for the agent, a summary of the customer's changed and unchanged travel arrangements. At the same time, the system also displays an employer's business policies, guidelines, or restrictions for travel, if any. Consequently, the agent can review the latest travel arrangements for a customer, in order to determine if they meet the employer's requirements. At block 172, the agent inputs any non-compliant arrangements (sometimes required by an individual customer or an exigency) to system 10, which stores the information in the relational database.

At block 174, system 10 updates the customer's PNR in the relational database, with the latest travel arrangement changes, and displays the updated PNR to the agent for review. At block 176, the system terminates the service tracking routine, and the present software routine 134 is terminated.

Figure 8:
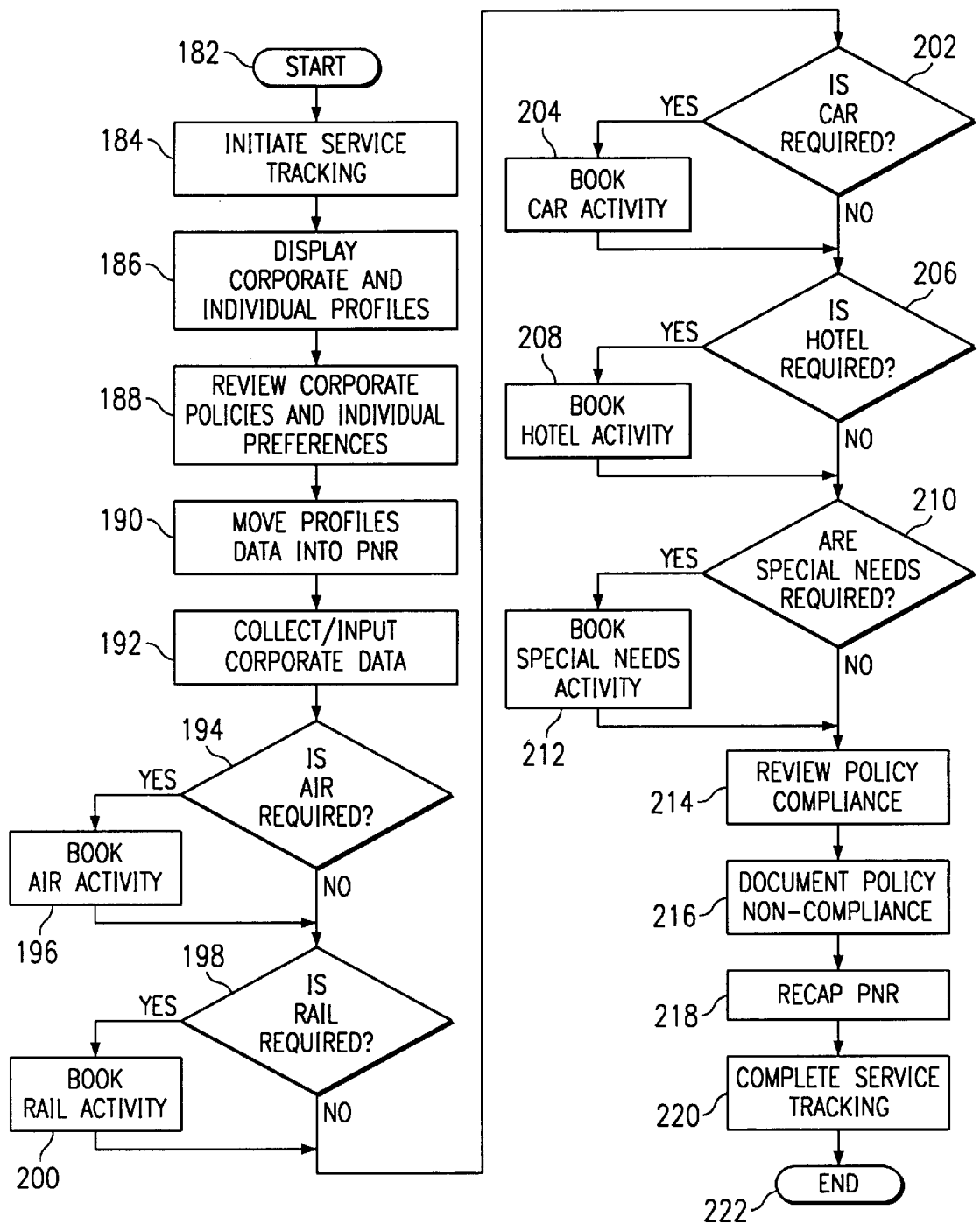

FIG. 8 is an exemplary flowchart for a software-assisted subroutine 132, which can be used by an agent to make a new travel reservation. Essentially, under the control of the new reservation subroutine 132, system 10 prompts a travel agent to make a new set of travel reservations for a customer.

At block 184, for accurate billing, system 10 initiates the service tracking subroutine described above. At block 186, system 10 retrieves the customer's individual profile information, and the employer's profile information (if any) from the relational database, and displays the information to the agent via a workstation. At block 188, system 10 prompts the agent to review the profile information. At block 190, system 10 creates a PNR for the customer in the relational database, and stores the profile information in the PNR. At block 192, system 10 prompts the agent to obtain and input (via a workstation 30) any business entity information required by the customer's employer (e.g., billing code to be charged).

At block 194, system 10 determines whether or not an air travel reservation is required. If so, at block 196, system 10 prompts the agent to input the air reservation information to system 10, which stores the information in the relational database for booking.

Essentially, the method used to determine and store air reservation information (blocks 194 and 196) preferably is also used to determine and store new information for requested rail, auto and hotel arrangements (blocks 198–208).

At block 210, system 10 prompts the agent to determine whether or not the customer requires any "special" travel arrangements to be made. If so, at block 212, the agent inputs the requested changes to system 10, which stores the information in the relational database for booking.

At block 214, system 10 preferably displays, for the agent, a summary of the customer's travel arrangements. At the same time, the system also displays any employer's business policies, guidelines, or restrictions for travel, if any. Consequently, the agent can review the new travel arrangements for a customer, in order to determine if they meet the employer's requirements. At block 216, the agent inputs any non-compliant arrangements, if any, to system 10, which stores the information in the relational database. At block 218, system 10 displays the new PNR to the agent for review. At block 220, the system terminates the service tracking routine, and the present software routine 132 is terminated.

Figure 9:
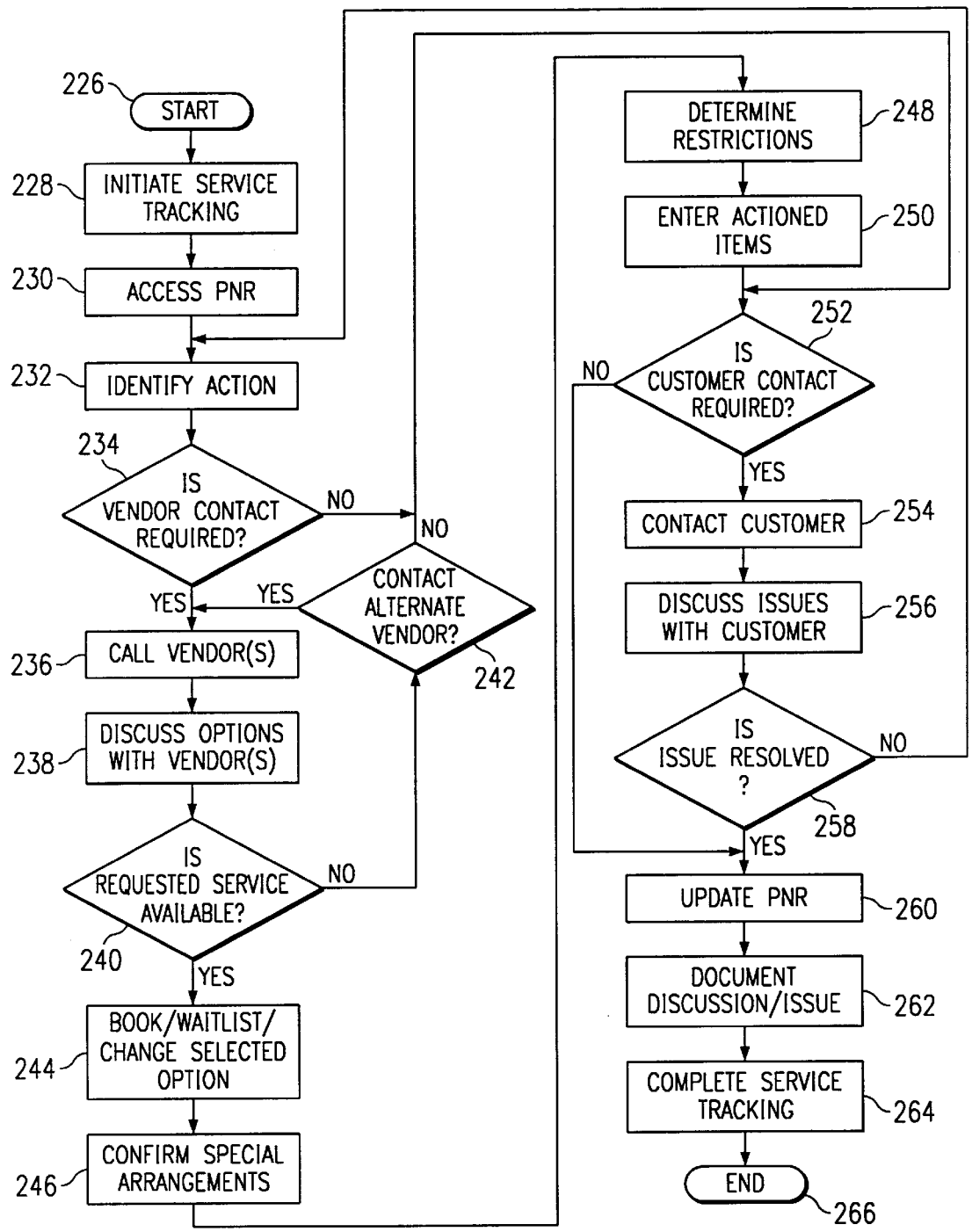

FIG. 9 is an exemplary flowchart for software-assisted routine 128, which can be used by an agent to perform certain arrangement follow-up tasks. As described above, system 10 stores certain follow-up tasks in an agent's queue or worklist, in the relational database. System 10 relates each task in the queue with a specific PNR, since the PNR readily identifies the requesting customer. Under the control of the follow-up software subroutine 128, system 10 prompts the travel agent to perform the actions listed in the agent's queue.

Specifically, at block 228, system 10 initiates the service tracking software routine described above. At block 230, system 10 prompts the agent to retrieve the PNR information associated with each task listed in the agent's queue. At block 232, system 10 prompts the agent to identify the action(s) required in the queue. At block 234, system 10 prompts the agent to identify whether or not a travel services vendor should be contacted, in order to complete the selected action(s). If so, at block 236, system 10 prompts the agent to contact the vendor. Otherwise, the software routine proceeds to block 252.

At block 238, the system prompts the agent to discuss pertinent travel service options available with the vendor. At block 240, system 10 prompts the agent to determine whether or not the requested travel service is available from that vendor. If so, at block 244, system 10 prompts the agent either to book or "wait list" the requested service for that customer. Otherwise, at block 242, system 10 prompts the agent to determine whether or not the agent should contact an alternate vendor. If so, the agent is prompted to contact the vendor (block 236). If not, at block 252, system 10 prompts the agent to determine whether or not the agent should contact the customer.

At block 246, system 10 prompts the agent to confirm that any special arrangements made have been booked with the pertinent vendor. At block 248, system 10 prompts the agent to determine if any non-business entity restrictions apply to the travel arrangements that have been made (e.g., hotel check-out required by 12:30 p.m.). At block 250, the agent inputs information (via a workstation) about the results of the tasks completed. System 10 stores the results information (e.g., completed or uncompleted tasks) in the relational database.

Returning to block 252, if the agent determines that a customer should be contacted, for any reason, the software routine proceeds to block 254, and the customer is contacted by telephone, facsimile, etc. At block 256, system 10 prompts the agent to discuss any open issue with the customer. For example, the agent may discuss the possibility of changing the customer's seating arrangement, if a more desirable seat becomes available. At block 258, the agent is prompted to input information about whether each outstanding issue has been resolved. If not, the software returns to block 232, where the action or task to be completed is identified. The software continues to block 234.

Otherwise, if all outstanding issues have been identified as resolved by the agent, at block 260, the system updates the customer's PNR with the most current travel arrangement information. At block 262, the system prompts the agent to document the complete discussion with the customer. At block 264, the system terminates the service tracking routine, and at block 266, the present software routine 128 is terminated.

Figure 10:
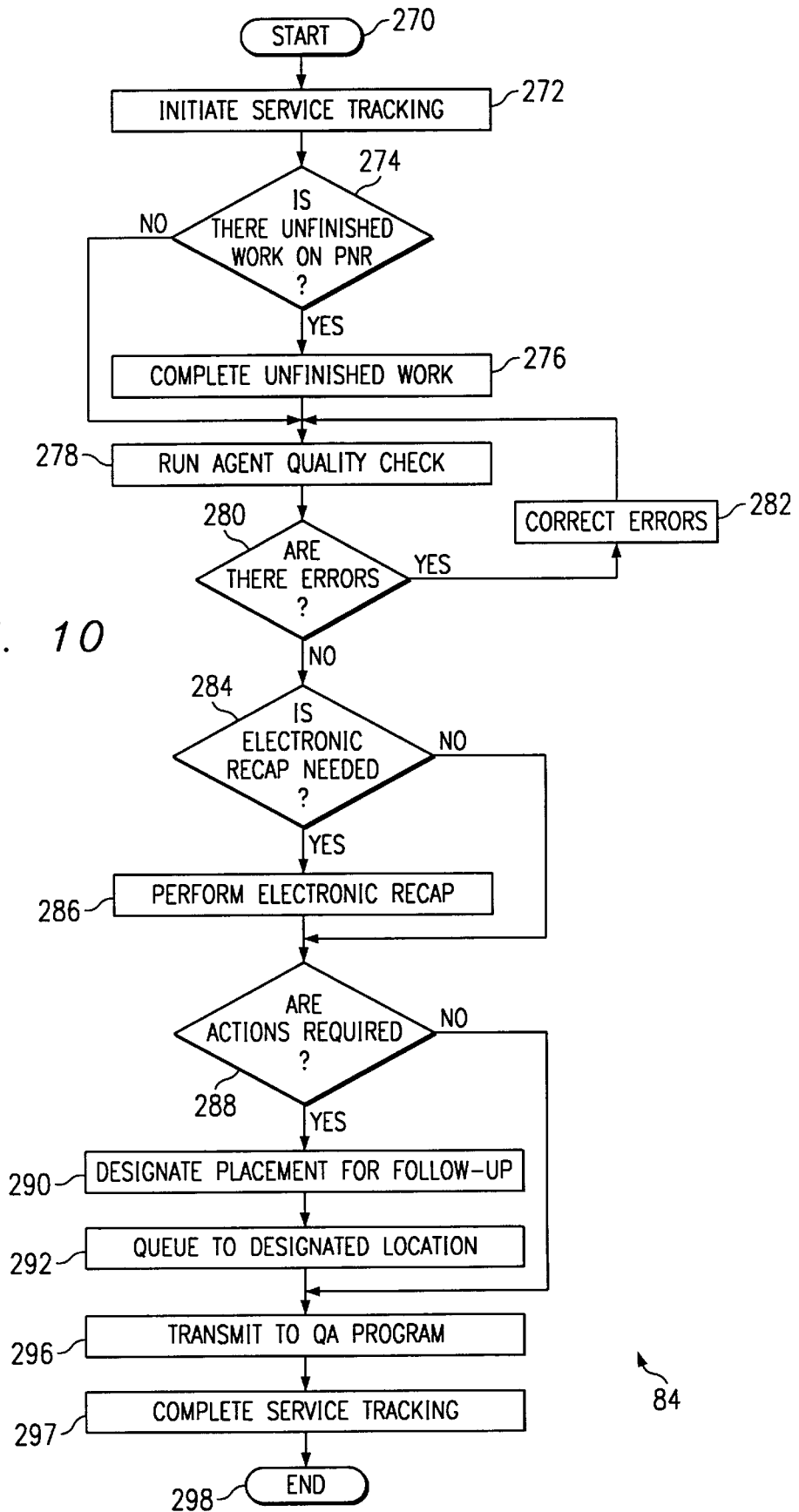

FIG. 10 is an exemplary flowchart for a software routine 84, which can be used by an agent to complete any PNR-related tasks that were not performed during the initial customer contact. Referring to block 272 in FIG. 10, for agency billing purposes, system 10 initiates the service tracking software routine described above. At block 274, the system prompts the agent to determine, and input information about, whether or not any tasks associated with the requesting customer's PNR remain to be completed. If so, at block 276, the system prompts the agent to complete the unfinished task(s). Otherwise, at block 278, the system retrieves the travel arrangement information from the PNR stored in the relational database, and compares the information with a predetermined set of "quality" criteria. At block 280, using the comparison information, the system determines whether or not the agent has made any "errors" or deviances from the "quality" criteria. If so, the system prompts an agency employee (preferably a supervisory agent) to see that the "errors" are corrected at block 282. The system continues to check the "quality" of the agent's work, on the pertinent request, until all the "errors" are deemed corrected.

At block 284, the system prompts the agent to determine whether or not an electronic "recap" (e.g., facsimile or e-mail message) of the detailed travel arrangements should be sent to the customer. If so, at block 286, the system generates and transmits the "recap" over an appropriate medium to the customer's facsimile receiver or e-mail post-office box.

Otherwise, at block 288, the system determines whether or not any action still remains to be performed, in order to complete this travel request. For example, a hotel may still have to be called to verify rates or guarantee a reservation. If so, at block 290, the system designates which resource—agent or machine—will be responsible for completing the open action(s). At block 292, system 10 outputs a "queue" to the designated resource, which notifies the agent, or activates the machine, to complete the task(s) in the "queue."

At block 296, the system outputs a "queue" to initiate a QA program, such as, for example, the AQUA QA software routine. The QA software is used by an agency to ensure that it is providing high quality services. At block 296, the service tracking software routine is terminated. The present subroutine 84 is then terminated.

Figure 11:
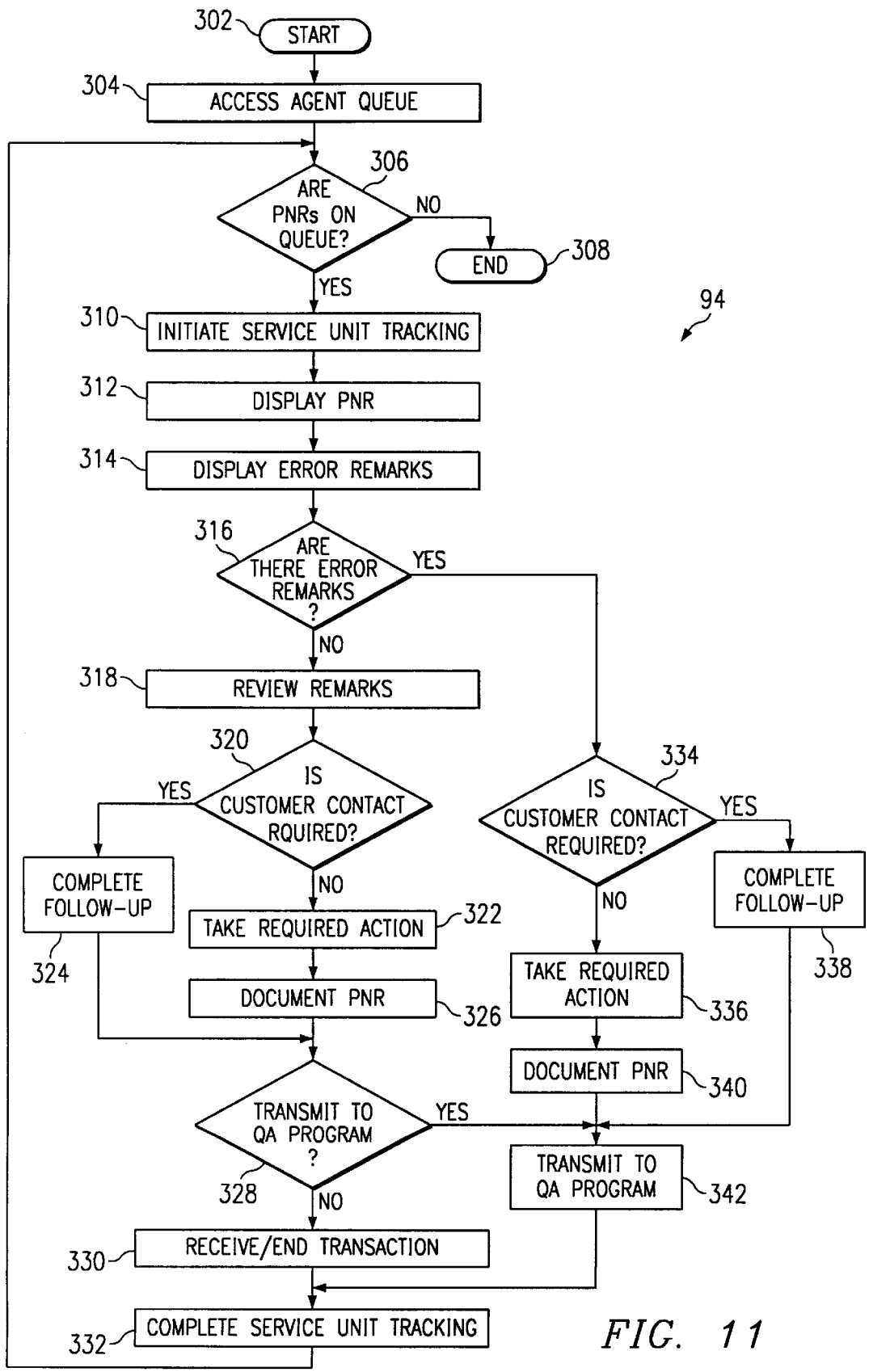

FIG. 11 is an exemplary flow chart for a software-assisted routine 94, which can be used by an agency to correct any error that has been identified by the QA software routine illustrated by FIG. 10. As described above, a QA software routine may "trigger" one or more queues when a quality assurance "error" is detected. A particular agent is preferably designated to complete the tasks in one or more unique queues. At block 304, the system retrieves a unique set of queues for an agent. At block 306, the system determines whether or not any actions relating to any PNR are listed on the agent's queue(s). If not, the software routine 94 is terminated.

Otherwise, at block 310, the system initiates the service tracking software. At block 312, the system displays the "open" PNR to the appropriate agent. At block 314, the system also displays any "error" remarks generated by the QA program to the agent. These "error" remarks signify that the PNR contains certain errors associated with processing, reporting, or ticketing, in response to a travel request. At block 316, the system determines whether or not the PNR contains critical "error" remarks. If not, at block 318, the remarks are displayed for review by an agent. At block 320, the system prompts the agent to determine whether or not the customer needs to be contacted. If so, at block 324, the system initiates a follow-up software routine, such as the routine 128 illustrated by FIG. 9. Otherwise, at block 322, the system prompts the agent to take the action required to remove the "error". For example, if the QA program has determined that the dates for the travel arrangements described in a PNR do not correspond to the dates specified in the travel request, the agent is prompted to re-book the arrangements for the proper dates. At block 326, the system stores those changes, if any, in the PNR in the relational database.

At block 328, the system prompts the agent to determine whether or not the corrected PNR information should be retrieved and operated on by the QA routine. If so, at block 342, the information is transmitted for processing to the QA routine. Otherwise, at block 330, the system indicates that the transaction has been completed. At this point, the customer typically has either committed to complete the travel arrangements or declined. At block 332, the system terminates the service tracking routine, and the software returns to block 306.

Returning to block 334, for a critical QA "error," the software routine performs essentially the same method performed for a non-critical "error" (blocks 320–328) except at block 342, the system transfers the PNR "queue(s)" directly to the QA program. The system then proceeds to block 332.

FIGS. 4–11 illustrate the operation and functions of the domestic reservations component 56. Notably, the method for the international reservations component 58 can be performed with the method used for the domestic reservations component 56. The primary difference between the two reservation components is that one can be used to make and change domestic travel arrangements, and the other can be used to make and change international arrangements. The two components' software and manual functions are substantially the same.

Figure 12:
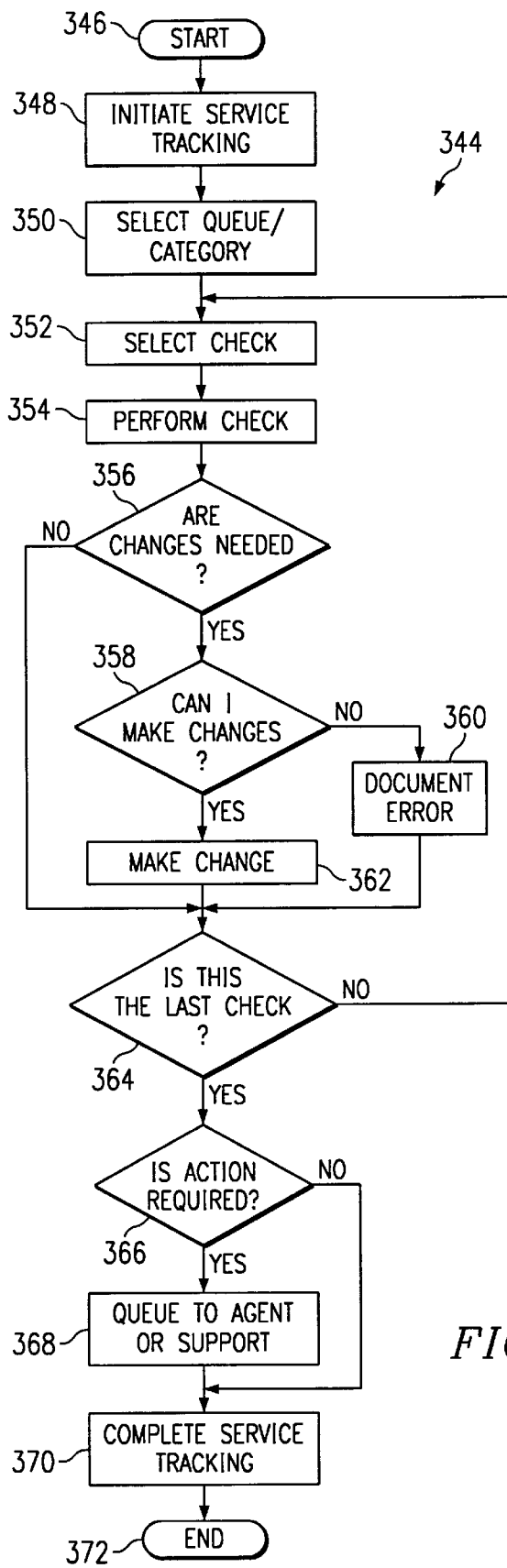

FIGS. 12–16 are exemplary flowcharts of software-driven functions that can be performed for a travel agency, in conjunction with an agent, by the support component 60 shown in FIG. 3. Specifically, FIG. 12 is an exemplary flow chart for a software-assisted routine 344, which can be used by an agent to perform pre-ticketing quality assurance. Pre-ticketing QA can be used by an agency to perform a final check on a customer's travel arrangements, before the customer's tickets are issued.

At block 348, the system initiates the service tracking software program described earlier. At block 350, the system prompts the agent to select a queue (or QA category) that lists one or more QA checks that should be performed on the customer's arrangements. At block 352, the system prompts the agent to select a check to be performed, from the selected queue or category. Each check selected preferably corresponds to a travel arrangement that should be verified or reviewed, such as, for example, the fares and seating availability on flights. At block 354, the system prompts the agent to perform the selected check.

At block 356, the system prompts the travel agent to determine whether or not any changes still should be made to the travel arrangements. If so, at block 358, the system prompts the agent to determine whether or not the changes to be made are of the type the agent can make. For example, if reservations have been made for the wrong date, the agent can determine the correct dates and book the change. If the agent cannot make the change, at block 360, the system stores those "errors" in the relational database for reporting purposes. Otherwise, at block 362, the system prompts the agent to make or book the change.

At block 364, the system (iteratively) prompts the agent to determine whether or not the check being processed is the last check listed in the queue or category. If not, the software loops back to block 352. Otherwise, at block 366, the system determines whether or not any action is required to be taken on the check being made. If so, at block 368, the system transmits a queue to an appropriate resource (e.g., travel agent or support staff), which indicates that certain action should be taken on the customer's arrangements.

At block 370, the system terminates the service tracking routine, and the present software routine is terminated.

Figure 13:
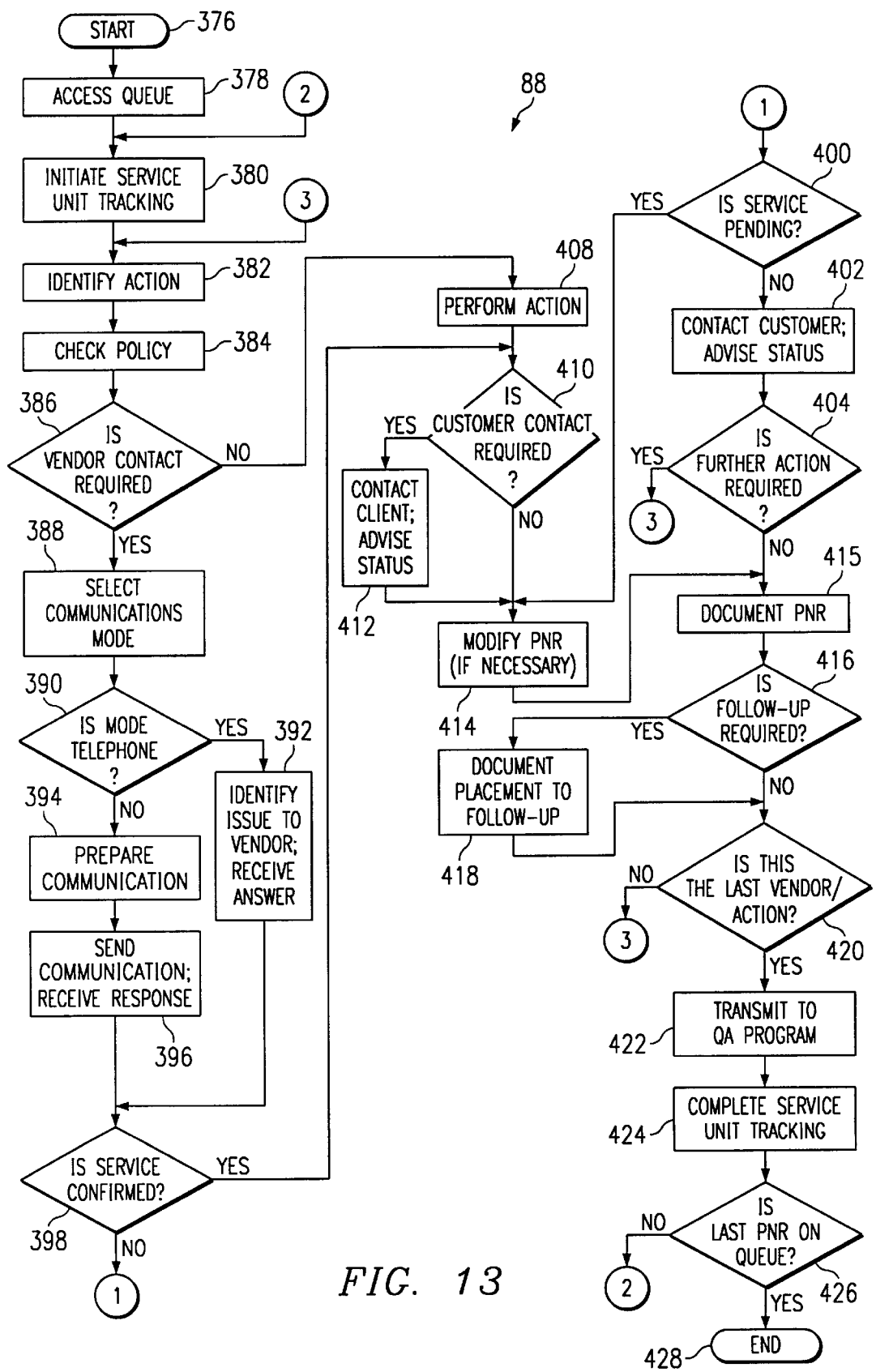

FIG. 13 is an exemplary flowchart for a software-assisted routine 88, which an agent can use to complete travel arrangements that may require direct contact with a vendor, or the arrangements may be too time-consuming to complete while the customer is on the phone. Although the present routine 88 is associated with the support component 60, it can be initiated during operation of the domestic reservations component 56.

Referring to FIG. 13, at block 378, the system retrieves a queue of outstanding actions to be completed. At block 380, the system initiates the service tracking software routine. At block 382, the designated travel agent (identified by the queue) selects a task to complete. At block 384, the agent compares the arrangements made with the employer's guidelines, if any. At block 386, the system prompts the agent to determine whether or not a vendor should be contacted. If not, at block 408, the system prompts the agent to perform the required action.

Otherwise, at block 388, the agent selects a communications mode to contact the vendor. At block 390, if the selected mode is by telephone, the agent calls the vendor. If another mode is selected, at block 394, the system prompts the agent to prepare a communication, such as a letter or e-mail message, which is sent to the vendor at block 396.

At block 398, after receiving a response from the vendor, the system prompts the agent to determine whether or not the vendor has confirmed the requested arrangement. If so, the software proceeds to block 410. Otherwise, at block 400, the system prompts the agent to determine whether or not the service to be provided is still pending without being confirmed. If the service is still pending, the software proceeds to block 414. Otherwise, at block 402, the system prompts the agent to contact and advise the customer about the still pending arrangement(s). At block 404, the agent is prompted to determine whether or not any further action should be taken for the retrieved queue. If so, the software proceeds back to block 382.

Returning to block 410, if the customer should be contacted, the software proceeds to block 412. The agent then contacts and advises the customer about the pending arrangement(s). Otherwise, at block 414, the agent inputs information about the changes made to the system, and at block 415, the system stores the input information in the PNR in the relational database. At block 416, the system prompts the agent to determine whether or not any follow-up action should be taken. If so, at block 418, the agent inputs the follow-up information to the system, which stores it in the relational database.

At block 420, the agent determines whether or not the vendor action being processed is the last action listed in the queue. If not, the software proceeds to block 382. Otherwise, at block 422, the system transfers the queue task information to the QA software program, the function of which has been described above. At block 424, the system terminates the service tracking routine. At block 426, the system determines whether or not the PNR being processed is the last PNR listed in the queue. If not, the software proceeds back to block 380. Otherwise, the present software routine is then terminated.

Figure 14:
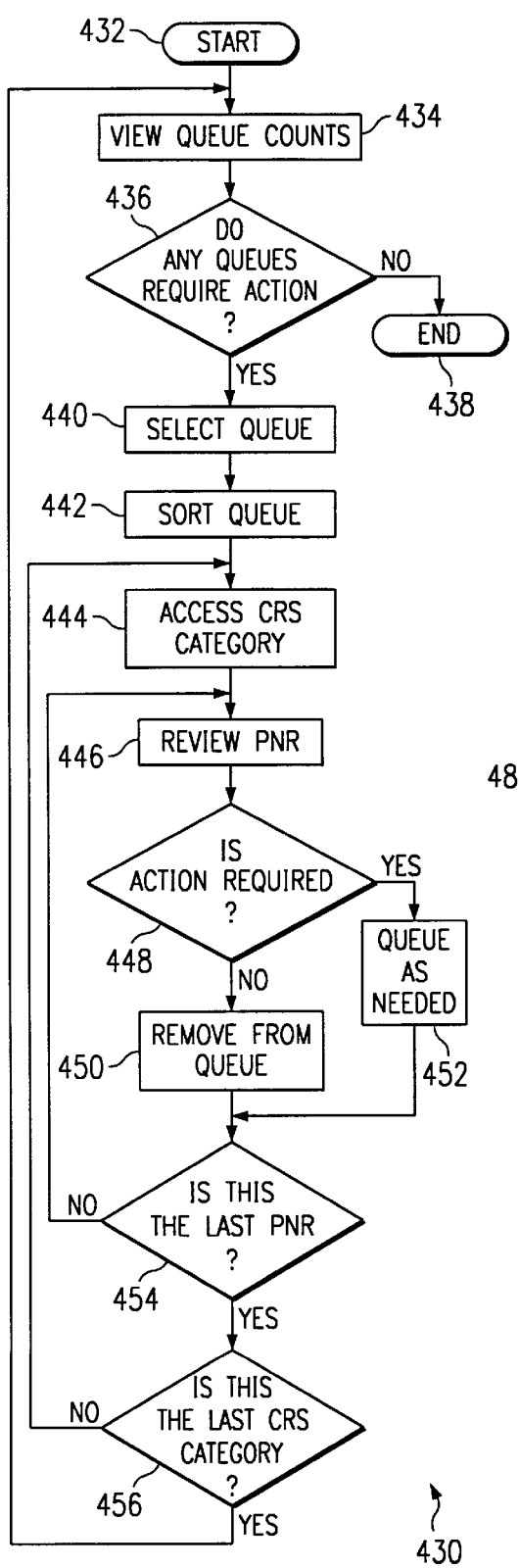

FIG. 14 is an exemplary flowchart for a queue management software routine 430. Queue management software routine 430 can be used to redistribute actions associated with different PNRs from one queue to another, or remove an action from a queue once the action has been completed. At block 434, the system retrieves the queue count information from the relational database and displays it to an agent. The agent determines the status of each queue. At block 436, the agent determines whether or not any queue contains a task that still should be completed. If at least one queue contains an incomplete task, the software proceeds to block 440. Otherwise, at block 438, the software routine is terminated.

At block 440, the agent selects a queue that contains at least one task that still should be completed. Each task is associated with a specific PNR. At block 442, the system sorts the PNRs associated with the tasks by computer reservation system. For example, a queue may list five PNRs, three related to airline travel, and two related to bus travel. Airline travel arrangements are typically made using information from an airline travel computer reservation system, while bus travel arrangements are made using information from a different computer reservation system.

Preferably, the system retrieves the computer reservation system from the relational database.

At block 444, the system retrieves information from a selected category within the computer reservation system. Each category is associated a certain type of arrangement. For example, one category may specify either smoking or non-smoking seating arrangements, while another category may specify first class seating or coach. At block 446, the agent is prompted to review the PNR associated with the selected category. At block 448, the system prompts the agent to determine whether or not any action is required with respect to the reviewed PNR. If so, at block 452, the system transmits a queue to an appropriate resource, which indicates action should be taken. Otherwise, at block 450, the system removes the PNR information from the queue.

At block 454, the system prompts the agent to determine whether or not the current PNR being processed is the last PNR that should be reviewed. If not, at block 446, the system retrieves the information from the next PNR to be reviewed. At block 456, the system prompts the agent to determine whether or not the current computer reservation system category being processed is the last category that should be reviewed. If so, the software returns to block 434. Otherwise, the software returns to block 444.

Figure 15:
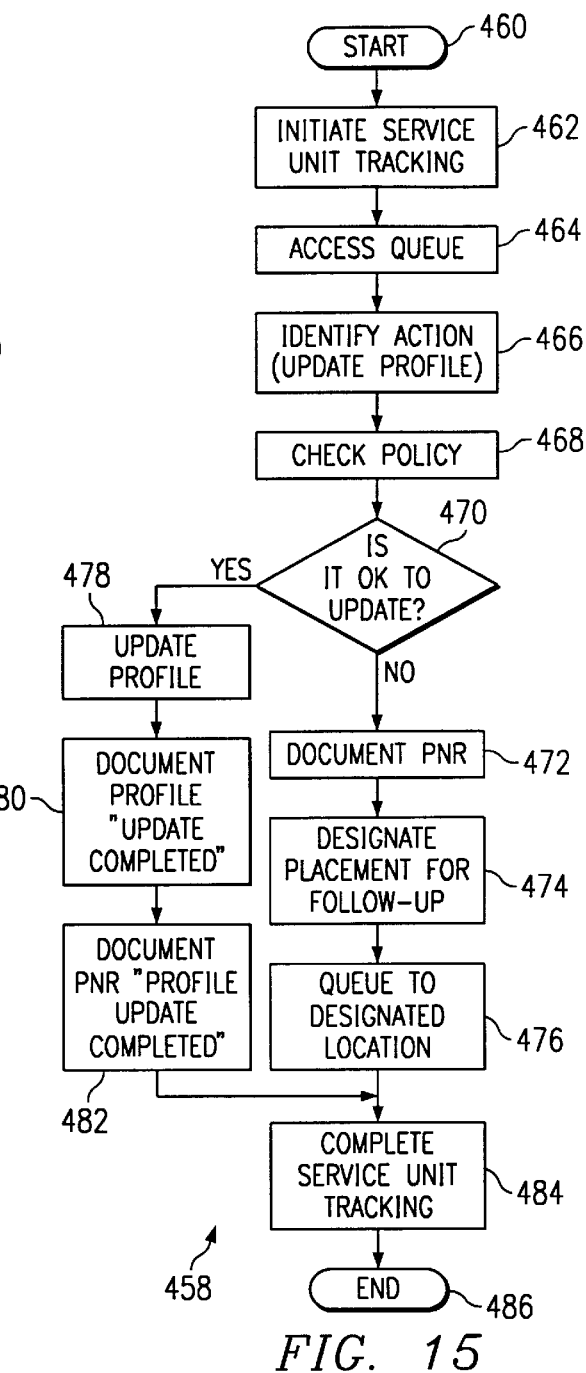

FIG. 15 is an exemplary flowchart for a software routine 458, which can be used to create and update individual and business entity profiles. Referring to FIG. 15, at block 462, system 10 initiates the service tracking software program. At block 464, the system prompts an agent to select a queue for review. At block 466, the agent is prompted to identify the particular task to be performed from the queue (e.g., update a specific individual or business entity profile). At block 468, the agent is prompted to review the business entity travel guidelines and policies (e.g., restrictions) stored in the relational database. At block 470, the system prompts the agent to determine whether or not the profile under consideration may be updated. If not, at block 472, the PNR information retrieved from the relational database is restored. At block 474, the system (or the agent) designates an agent, or another employee (or a machine) to follow up the task (attempt to update at a later time). At block 476, the system transfers the queue(s) to the designated follow up resource. For example, another agent can be notified by the queue that an attempt should be made to update the profile at a later date. At block 484, the system then terminates the service tracking software routine.

Otherwise, if an update to the profile can be made, at block 478, the agent performs the update by inputting the new information via the workstation. The system stores the update information in the profile residing in the relational database. At block 480, the agent inputs a command which indicates for the system that the profile update has been completed. At block 482, the system stores a flag indicating that the profile has been updated, in the PNR in the relational database. The software proceeds to block 484, where the service tracking software routine is terminated. The present software routine is then terminated.

Figure 16:
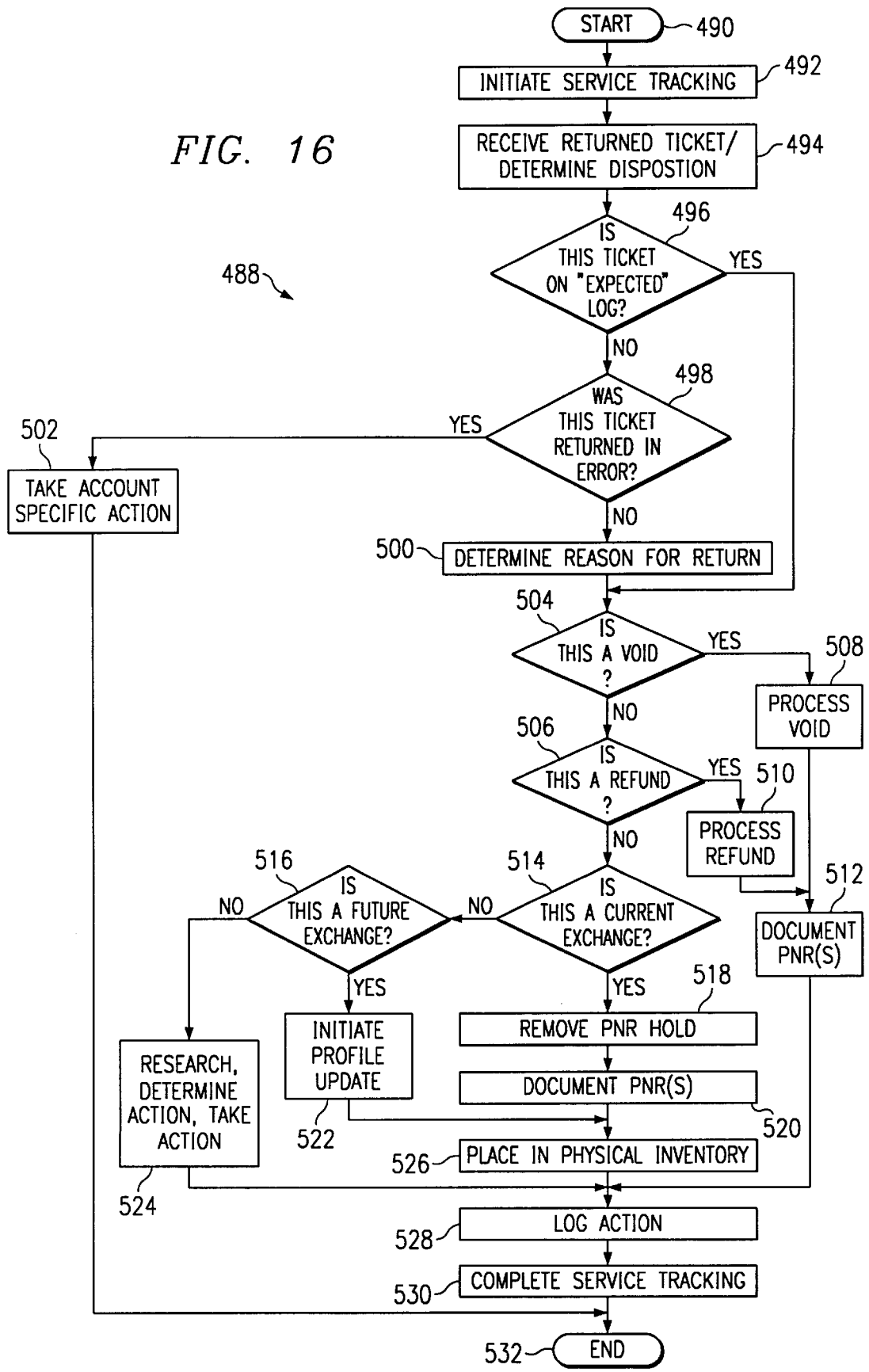

FIG. 16 is an exemplary flowchart for a software-driven routine 488, which an agency may use to automatically process a returned ticket. For example, such a return can include a ticket returned for a refund or exchange, or a voided ticket. Essentially, the system maintains (in the relational database) an inventory of all tickets processed by the agency. The system thereby assists the agency in managing the ticket processing. The inventory information can include an indicator that the ticket may be returned. The system also assists the agency specifically with managing the inventory of returned tickets.

Referring to FIG. 16, at block 492, system 10 initiates the service tracking software routine for billing purposes. At block 494, an agent receives a returned ticket from a customer. The system prompts the agent to determine the disposition of the ticket (e.g., the reason for the return and action to be taken). For example, if the ticket has been returned for a refund, the customer's account should be credited.

At block 496, the system determines whether or not the returned ticket is on the "expected" return log in the relational database. The "expected" return log can be the listing of tickets in the database that the agency has identified as likely to be returned. For example, a ticket is likely to be returned when a customer has an issued ticket canceled and receives another ticket in its place.

If the returned ticket is not on the "expected" return log, at block 498, the system prompts the agent to determine whether or not the ticket was returned in error. If so, at block 502, the system prompts the agent to take specific actions with respect to the customer's account, such as, for example, reviewing a business entity's guidelines or restrictions that should be followed whenever an employee's ticket is returned. At block 532, the software routine is then terminated.

On the other hand, if the ticket was not returned in error, at block 500, the system prompts the agent to determine specifically why the ticket was returned. At block 504, the system prompts the agent to determine whether or not the ticket is void. If the ticket is void, at block 508, the system processes the void ticket by establishing communication with an appropriate CRS and noting the ticket as void in that CRS. Accordingly, billing and reconciliation for the void ticket is halted.

Otherwise, at block 506, the system prompts the agent to determine whether or not the ticket is being returned for a refund. If so, at block 510, the system processes the refund by establishing communication with the appropriate CRS and ARC accounting system and noting in those systems that the refund is due. Furthermore, if the customer must pay a cancellation fee for the refund, system 10 notifies the agent that reconciliation is required for the cancellation fee. At block 512, the system stores the void and refund transactions in the customer's PNR in the relational database.

Returning to block 506, if the return is not a refund, at block 514, the system prompts the agent to determine whether or not the ticket has been returned for an immediate exchange. If so, at blocks 518 and 520, the agent inputs a command to the system that allows the system to store the exchange information in the PNR, for documenting purposes. Otherwise, at block 516, the system prompts the agent to determine whether or not the ticket has been returned for a future exchange. If so, at block 522, the agent inputs a command to the system, which initiates the software routine described above that updates the customer's (and employer's, if any) profile. If not, at block 524, the system prompts the agent to research and determine what actions should be performed, and then perform the appropriate task.

Returning to block 526, the system prompts the agent to place the returned ticket in an appropriate receptacle for physical inventory. At block 528, the system "logs" the action(s) or task(s) performed by the agent, by storing information about the action(s) taken, in the relational database. At block 526, the system terminates the service tracking software routine, and then terminates the present routine.

Figure 17:
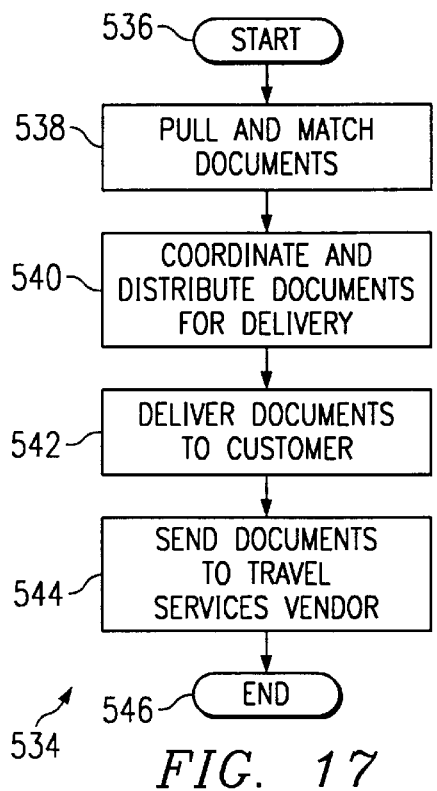
FIGS. 17–19 are exemplary flowcharts of software routines for the global distribution function or component shown in FIG. 3.
Figure 18:
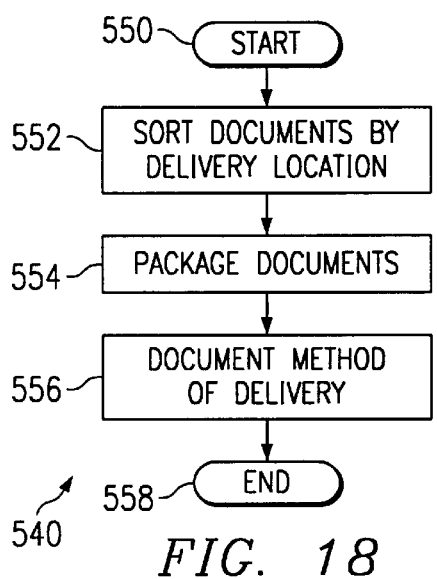
Figure 19:
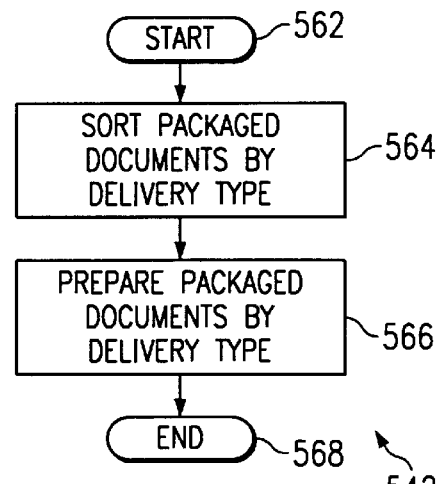

FIGS. 17–19 are exemplary flowcharts of software-assisted functions or components that can be performed for a travel agency, by the global distribution component 48 shown in FIG. 3. Specifically, FIG. 17 is an exemplary flow chart for a ticketing and delivery software-assisted routine 534, which an agency can use to assist an agent to generate tickets and deliver them with related documents (e.g., an invoice) to customers. At block 538, the system prompts an agency employee to remove a ticket from the printer and match it with the related documents. At block 540, the system prompts the employee to coordinate the distribution of the documents for delivery. At block 542, the system prompts the employee to send certain of the documents (e.g., the tickets) to the customers. At block 544, the other documents can be sent, for example, to the vendors providing the travel services. At block 546, the present software routine is terminated.

FIG. 18 is an exemplary flowchart for a software-assisted routine 540, which an agency can use to coordinate and distribute travel documents for delivery. This routine can be used to organize the documents, so that the documents being sent to one destination can be combined in one delivery. At block 552, the system prompts an agency employee to sort the travel documents by delivery location. For example, all airline tickets, train tickets, and hotel reservations requested by a particular customer are placed together. At block 554, the system prompts an employee to package the documents that have been sorted together. The system also prompts the employee to package any additional documents, such as, for example, car rental advertisements, along with the sorted documents.

At block 556, the system records or stores the delivery method used for the documents, in the relational database. For example, the system can record the customer's name, information about the tickets being sent, the name of the delivery service utilized, and the date the delivery service received the tickets for delivery. Consequently, the system can keep track of the documents once they are turned over for delivery. At block 558, the software routine is terminated.

FIG. 19 is an exemplary flowchart for a software-assisted routine 560, which an agency can use to deliver tickets and other related documents to the requesting customer. Referring to FIG. 19, at block 564, the system prompts an agency employee to sort the documents by delivery type, such as, for example, by Federal Express, Express Mail, or the United Parcel Service. At block 566, the system prompts the employee to prepare the documents by delivery type. Consequently, documents which should be sent out immediately can receive a high priority. The software routine is then terminated.

Figure 20:
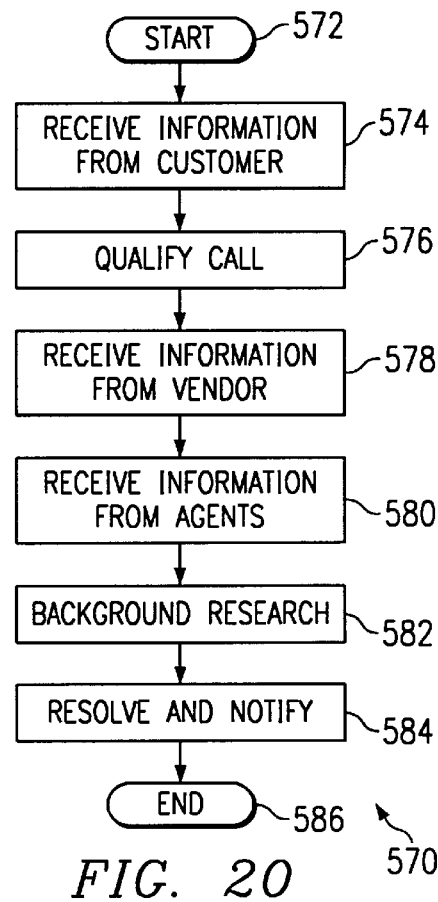
FIGS. 20–21 are exemplary flowcharts of software routines for the special services function or component shown in FIG. 3.
Figure 21:
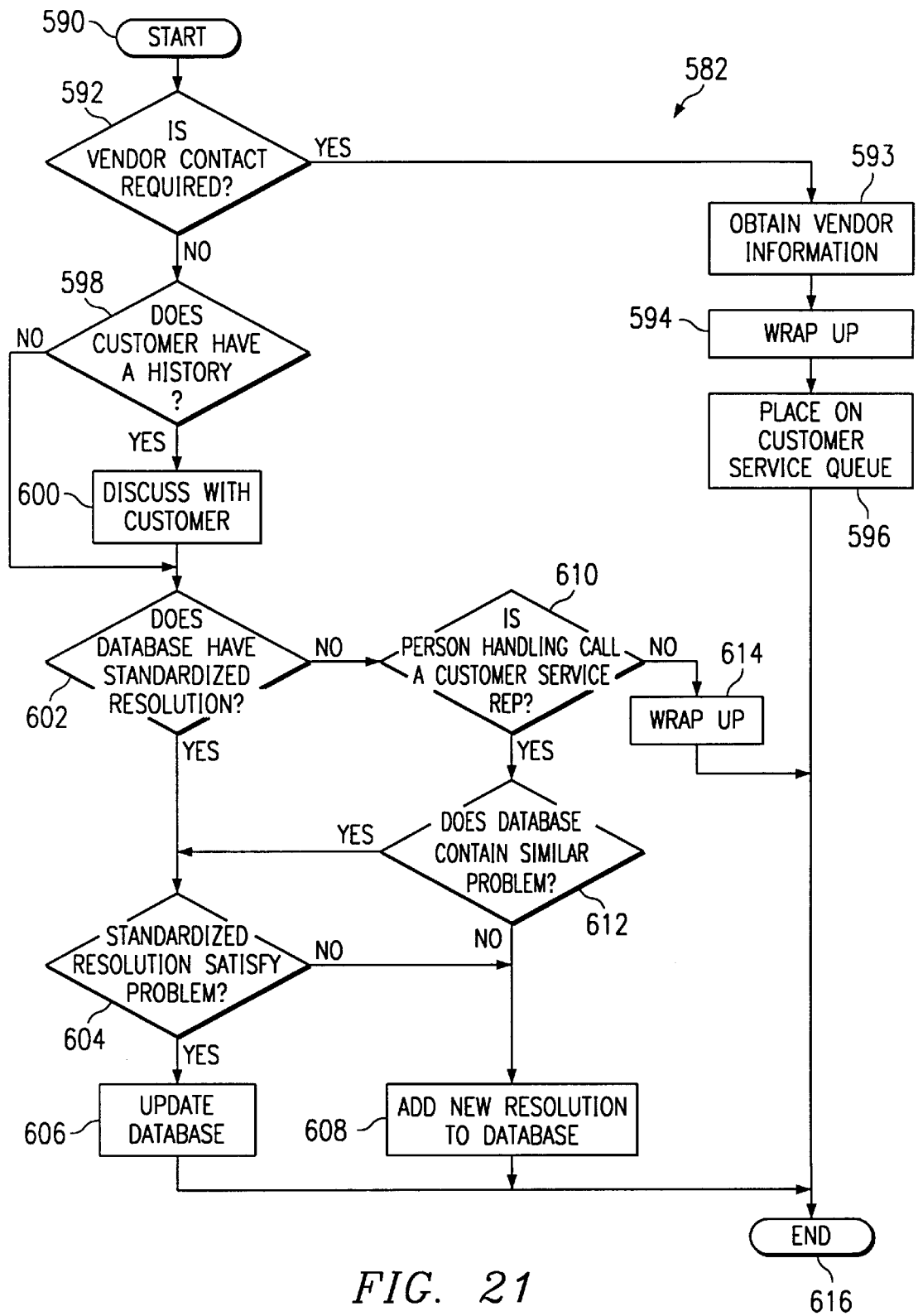

FIGS. 20–21 are exemplary flowcharts of software-driven functions that can be performed for a travel agency, by the special services component 50 shown in FIG. 3. Specifically, FIG. 20 is an exemplary flowchart for a software-assisted routine 570, which can be used by an agency to prompt a response to, and keep track of, any customer problems.

At block 574, the agency receives travel-related information typically during a call from a customer. At block 576, the system prompts the employee receiving the call to identify any problem so that it can be routed to an appropriate resource for handling. At blocks 578 and 580, respectively, the problem information can also be received from a vendor or another travel agent. At block 582, the system prompts the employee (or other personnel) to conduct background research for the problem(s). For example, if a customer has not yet received his or her ticket by a specified date, an agent may call the service that was responsible for delivering the ticket, in order to determine what happened to the ticket. At block 584, the system prompts the agent to resolve the problem and notify the customer that it has been resolve. The software routine is then terminated.

FIG. 21 is an exemplary flowchart for a background research software routine 582, which can be used by an agency to assist with background research for a customer's problem. Referring to FIG. 21, at block 592, the system prompts an agent to determine whether or not a travel services vendor needs to be contacted about a problem. If so, at block 593, the system prompts the agent to obtain information that can be used to resolve the problem, from the vendor. At block 594, the system prompts the agent to perform a wrap-up by documenting in the system the required information about the problem and its resolution. At block 596, the system prompts the agent to generate a service queue to perform the service properly for the customer. The software routine is then terminated.

Otherwise, at block 598, the system prompts the agent to determine whether or not the customer has previously encountered similar problems. If so, at block 600, the system prompts the agent to discuss the problem with the customer. At block 602, the system displays (to the agent) typical problems encountered by customers, and a "standardized" set of procedures that could be used resolve the problems. This problem history information is maintained by system 10 in the relational database. The agent thus can determine whether or not the database has a standardized resolution for the type of problem being addressed. If so, at block 604, the system prompts the agent to determine whether or not a standardized resolution can satisfy the problem. If so, at block 606, the system prompts the agent to input information to the system that updates the relational database with the most current problem being addressed and the resolution method used. The present software routine is then terminated.

Otherwise, if the standardized resolution method will not satisfy the problem being addressed, at block 608, any new method used by the agent to resolve the current problem is input and stored with the other resolution methods in the relational database.

Returning to block 610, the system determines whether or not the employee handling the incoming call is a customer service representative. If not, at block 614, a wrap up is performed by documenting the required information about the problem and its resolution. The software routine is then terminated. If, however, the employee handling the call is a customer service representative, at block 612, the system prompts the employee to review a display of problems (retrieved from the relational database) and determine whether or not the database contains a similar problem, along with a corresponding standardized resolution method. If so, the software returns to block 604. Otherwise, the software proceeds to block 608. The software routine is then terminated.

Figure 22:
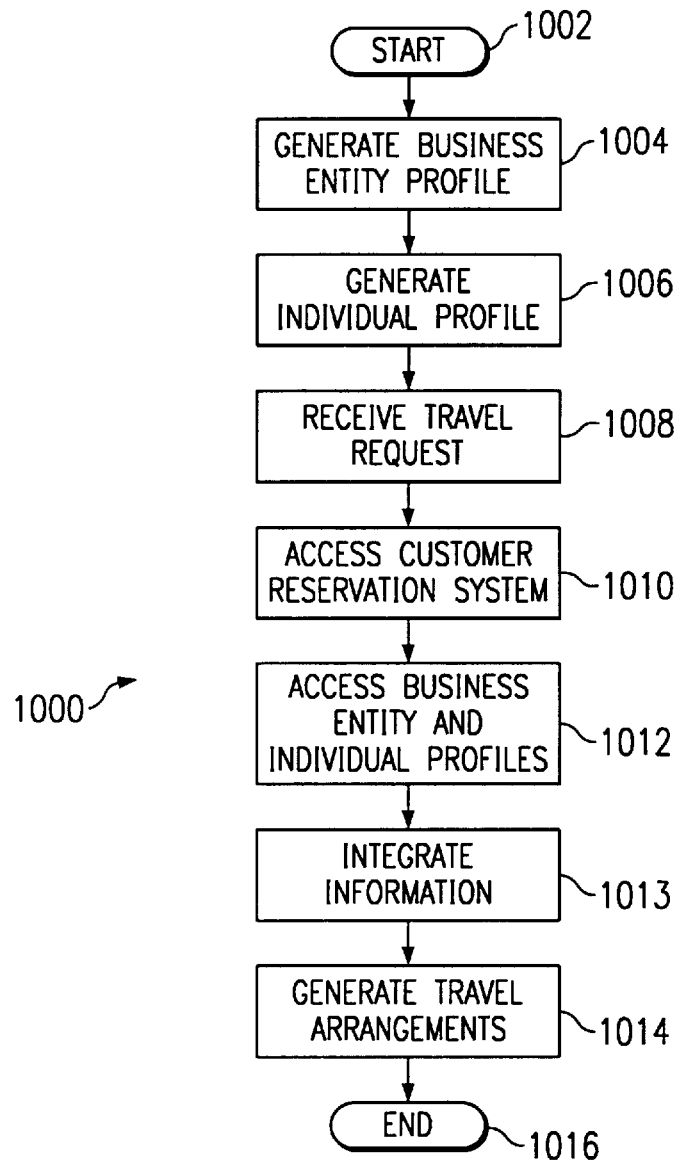
FIG. 22 is a flow diagram that illustrates a method of operating an automated travel management information system, in accordance with a preferred embodiment of the present invention.

FIG. 22 is a flow diagram which illustrates a method (1000) an agency may use to automatically manage travel information, in accordance with a preferred embodiment of the present invention. At block 1004, system 10 generates a business entity profile for a customer. At block 1006, the system generates an individual profile for a customer. The system stores the profile information in the relational database. At block 1008, a travel request is received from a customer over a suitable communications medium. At block 1010, system 10 retrieves information (preferably via a TIA subsystem) from one or more computer reservation systems. The system stores the customer reservation system information in the relational database. At block 1012, the system displays for use by an agency employee the business entity profile and individual profile information, for the requesting customer. At block 1013, the system integrates the customer reservation system information and the business entity and individual profile information, for that customer's request, preferably by related data fields. Consequently, the agent can access the customer reservation service information and the profile information, at the same time. At block 1014, the system generates appropriate travel arrangements in accordance with the travel request. The method is then terminated.

Although the present invention and its advantages have been described in detail, it should be understood that various changes, substitutions, and alterations can be made therein without departing from the spirit and scope of the invention as defined by the appended claims.

What is claimed is:

1. A method of providing decisional support for travel services, comprising the steps of:
    generating a business entity profile;
    generating an individual profile;
    automatically accessing plural computer reservation systems to obtain inventory information;
    integrating the inventory information received from the plural computer reservation systems so that the inventory information is accessible by a single format;
    storing the business entity profile, the individual profile, and the integrated inventory information in a database;
    receiving a travel request from a customer; and
    automatically accessing the database, including the integrated inventory information therein, in response to the reception of the travel request.

2. The method of claim 1, further comprising the step of generating complete travel arrangements for the customer in response to the received travel request.

3. The method of claim 1, wherein the step of automatically accessing the plural computer reservation systems comprises the step of receiving inventory information relating to travel services from each of the plural computer reservation systems.

4. The method of claim 3 wherein the inventory information from each of the plural computer reservation systems comprises airline flight availability information.

5. The method of claim 1, wherein the step of storing comprises the step of storing the business entity profile, the individual profile, and the integrated inventory information in a relational database.

6. The method of claim 1, further comprising the steps of:
    generating travel documents in response to the travel request; and
    distributing the travel documents to the customer.

7. The method of claim 1, further comprising the step of updating the business entity and individual profiles.

8. A method of providing decisional support for a travel agent providing travel services to at least one customer, comprising the steps of:
    generating a business entity profile, the business entity profile having business entity information relating to at least one business entity;
    generating an individual profile, the individual profile having individual information relating to the at least one customer;
    automatically accessing inventory information from plural computer reservation systems;
    integrating the business entity information, the individual information and the inventory information from each of the plural computer reservation systems, so that the integrated business entity, individual and inventory information is simultaneously accessible by the travel agent;
    receiving a travel request from the at least one customer; and
    generating travel arrangements for the customer in response to the received travel request, using the integrated business entity, individual, and inventory information.

9. The method of claim 8, wherein the step of generating travel arrangements is performed automatically.

10. The method of claim 8, wherein the integrating step includes the step of integrating the inventory information received from the plural computer reservation systems so that the integrated inventory information is accessible by a single format.

11. The method of claim 8 wherein the inventory information from each of the plural computer reservation systems comprises airline flight costs.

12. The method of claim 8, further comprising the step of updating the business entity information in the business entity profile and the individual information in the individual profile.

13. The method of claim 8, wherein the integrating step includes the step of storing the business entity profile, the individual profile, and the inventory information from the plural computer reservation systems in a database.

14. The method of claim 13, wherein the integrating step comprises the step of storing the business entity profile, the individual profile, and the inventory information from the plural computer reservation systems in a relational database.

15. A system of providing decisional support for a travel agent providing travel services to at least one customer, the system comprising:
    a database operable to store a business entity profile, an individual profile, and inventory information;
    a processor coupled to the database and operable to:
        automatically access plural computer reservation systems to obtain inventory information;
        integrate the inventory information from the plural computer reservation systems;
        receiving a travel request from a customer; and
        automatically access the database in response to the reception of the travel request; and
    a terminal associated with the processor, the terminal being operable to simultaneously display the business entity information, the individual information, and the integrated inventory information to the travel agent for arranging travel for the customer according to the travel request.

16. The system of claim 15, wherein the processor is further operable to generate travel arrangements for the customer.

17. The system of claim 15, wherein the business entity profile contains business entity information relating to at least one business entity and the individual profile contains individual information relating to at least one customer.

18. The system of claim 15, further comprising a travel information analysis device.

19. The system of claim 15, wherein the processor is further operable to integrate the inventory information from the plural computer reservation systems so that the inventory information is accessible by a single format.

20. The system of claim 15, wherein the processor is further operable to store the integrated inventory information in the database.

21. The system of claim 15, wherein the database is a relational database.

22. The system of claim 15, wherein the processor is further operable to verify fares for travel services provided abroad.

* * * * *